(12) United States Patent
Chiba

(10) Patent No.: US 6,411,552 B1
(45) Date of Patent: Jun. 25, 2002

(54) DATA PROCESSING SYSTEM, BLOCK ERASING TYPE MEMORY DEVICE AND MEMORY MEDIUM STORING PROGRAM FOR CONTROLLING MEMORY DEVICE

(75) Inventor: Toshihiko Chiba, Esashi (JP)

(73) Assignee: Tokyo Electron Device Limited, Kanagawa (JP)

( * ) Notice: Subject to any disclaimer, the term of this patent is extended or adjusted under 35 U.S.C. 154(b) by 0 days.

(21) Appl. No.: 09/498,066

(22) Filed: Feb. 4, 2000

Related U.S. Application Data

(63) Continuation of application No. PCT/JP98/02862, filed on Jun. 25, 1998.

(30) Foreign Application Priority Data

Aug. 4, 1997 (JP) .............................................. 9-208976

(51) Int. Cl.$^7$ ................................................ G11C 7/00
(52) U.S. Cl. ............. 365/185.33; 365/218; 365/230.01; 365/185.11; 711/201; 711/200; 711/220
(58) Field of Search ........................... 365/230.01, 218, 365/185.11, 185.33; 711/201, 200, 220

(56) References Cited

U.S. PATENT DOCUMENTS

| 5,485,595 A | 1/1996 | Assar et al. ................ 711/103 |
| 5,544,356 A | 8/1996 | Robinson et al. ........... 707/205 |
| 5,592,669 A | 1/1997 | Robinson et al. ........... 707/206 |
| 5,598,370 A | 1/1997 | Niijima et al. ......... 365/185.33 |
| 5,835,935 A | 11/1998 | Estakhri et al. ............. 711/103 |
| 5,933,847 A * | 8/1999 | Ogawa ........................ 711/103 |
| 6,125,435 A * | 9/2000 | Estakhri et al. ............. 711/201 |
| 6,212,097 B1 * | 4/2001 | Kihara et al. .......... 365/185.04 |

FOREIGN PATENT DOCUMENTS

| EP | 0 477 503 |   | 4/1992 |
| GB | 2 251 324 |   | 7/1992 |
| JP | 409035029 | * | 2/1997 |
| JP | 411053248 A | * | 2/1999 |
| WO | 97/10604 |   | 3/1997 |

OTHER PUBLICATIONS

Samsung Flash Revision 1.0, Samsung Electronics, Oct. 1994, pp. 1–28.
PC Card Standard, vol. 7, Media Storage Formats Specification, PCMCIA/JEIDA, Feb. 1995, pp. 8–19.

* cited by examiner

*Primary Examiner*—Viet Q. Nguyen
(74) *Attorney, Agent, or Firm*—Pillsbury Winthrop LLP

(57) ABSTRACT

A data processing system is provided with a flash memory including a plurality of blocks and capable of erasing stored data collectively in units of block and a memory control unit for accessing the flash memory, the memory control unit having a control circuit for formatting the flash memory according to a format information for substantially coinciding each cluster serving as a logical unit of memory region of the flash memory with integer ones of the blocks and a control circuit for determining a size and position of each cluster and carrying out access control for erasing, write-in and reading of data of the flash memory according to the size and position of the determined cluster.

10 Claims, 17 Drawing Sheets

DATA PROCESSING SYSTEM, BLOCK ERASING TYPE MEMORY DEVICE AND MEMORY MEDIUM STORING PROGRAM FOR CONTROLLING MEMORY DEVICE

CROSS REFERENCE TO RELATED APPLICATIONS

This is a continuation of Application No. PCT/JP98/02862, filed Jun. 25, 1998.

BACKGROUND OF THE INVENTION

This invention relates to data processing system using block erasing type memory device, block erasing type memory device and computer readable program memory medium storing program for formatting, data erasing and date write for block erasing type memory device.

Recently, a flash memory has been used as a portable nonvolatile memory medium instead of a floppy disk, particularly as a memory medium for a mobile information terminal. The flash memory mentioned herein refers to a nonvolatile block erasing type memory device comprising a plurality of blocks, in which data stored internally can be electrically erased by each block.

When the flash memory is used under a control of such a disk operating system as MS-DOS (Microsoft's trademark), it is formatted according to the same format as that used conventionally for the floppy disk so as to handle it in the same way as the floppy disk. According to this format, a memory area is divided to boot area, FAT (file allocation table) area, directory area and data area. The data area is logically divided to clusters according to a definition stored in the boot area and a file to be stored in the flash memory is memorized in units of one cluster.

However, in the format of the conventional flash memory, the position of the cluster does not coincide with that of a block.

Therefore, if it is intended to update data (file) stored in a cluster, data (file) not necessary to update is also erased in units of a block altogether. Thus, the data not necessary to update must be saved in other cluster.

The same problem occurs when data (file) is written into a flash memory.

Further, if erasing or write-in of data is executed, FAT or directory must be rewritten, so that correspondingly the data not necessary to erase must be saved in other block.

Therefore, in order to update a single file in a conventional block erasing type memory device, plural blocks must be updated even if it is data within one block. For the reason, data write processing is divided to two parts so that it takes a long time, thereby often leading to deceleration of the entire memory device operation.

The same problem occurs when data (file) is written into the flash memory.

Further, if erasing or write-in of data is executed, FAT or directory must be rewritten, so that correspondingly the data not necessary to erase must be saved in other block.

This problem becomes more conceivable when data processing unit such as CPU controls the block erasing type memory device through a direct access thereto without using a special controller for reduction of the size and power consumption of the memory device.

BRIEF SUMMARY OF THE INVENTION

An object of the present invention is to accelerate data access, particularly processing including data erasing in the block erasing type memory device.

Another object of the invention is to provide a block erasing type memory device having a format structure capable of achieving data write-in processing rapidly and making the best use of the storage capacity, data processing system using the same memory medium and a program memory medium storing a program for formatting of the block erasing type memory device, data erasing and data write-in.

According to a first aspect of the present invention, there is provided data processing system comprising a block erasing type memory device including a plurality of blocks, capable of erasing stored data collectively in units of one block and data processing means for accessing the block erasing type memory device, wherein the data processing means includes a formatting portion connected to the block erasing type memory device for formatting the block erasing type memory device according to formatting information for substantially coinciding the size and position of a cluster as a logical unit of a memory region of the block erasing type memory device with those of integer ones of the blocks, and an access control portion for determining the size and position of the cluster according to the format information and carrying out access control for data erasing, data write-in and data read-out for the block erasing type memory device according to the determined size and position of the cluster.

In this data processing system, a cluster includes integer ones of the blocks. Thus, data erasing and write-in processing can be carried out in units of one block. Thus, the necessity of saving other data for data write-in or erasing is eliminated, so that the data erasing and write-in processing can be carried out rapidly.

According to a second aspect of the present invention, there is provided a block erasing type memory device having a format information memory region for storing format information for making integer ones substantially correspond to a cluster serving as a unit of data memory region and capable of erasing stored data collectively in units of one block.

In this block erasing type memory device, the cluster includes integer ones. Thus, data erasing and write-in processing can be carried out in units of one block. Thus, the necessity of saving other data for data write-in is eliminated, so that the data erasing and write-in processing can be carried out rapidly.

Although ordinarily, the cluster has a single block, it may be formed of a plurality of the blocks.

The format information comprises information for corresponding the size of the cluster with the size of the block and a position adjusting region for coinciding a start position and end position of each of the clusters with the start position and end position of the block, for example, an empty region.

The block erasing type memory device may store directory information indicating a file name and head memory position and a file allocation table indicating a file position in a single cluster.

When data is stored in a memory medium, ordinarily it is necessary to memorize position information (e.g., file allocation table) indicating which position each data is stored and identification name (e.g., file name and directory) of each data. This position information and identification name must be updated each time when data write-in or erasing is carried out. In the above block erasing type memory device, the position information and identification name are stored in a single cluster or a single block. Therefore, the necessity of saving other data for updating these data is eliminated. Thus, the data write-in or erase processing can be carried out rapidly.

It is preferred that stored data of blocks other than the aforementioned block including the block for storing the format information is physically erased.

In general memory medium, it is possible to consider that data has been erased by replacing a particular portion of the data (e.g., head one character) with a specific code, without physically erasing data stored in the data region (e.g., erasing by writing data corresponding to "1").

However, in the block erasing type memory device like the flash memory, by such data erasing method, new data cannot be written over the erased data, so that the processing for saving the original data and erasing its appropriate area is required.

Because according to the present invention, in other regions than such particular regions as boot region and FAT region and the like, data has been erased, saving of data and erasing upon write-in processing become unnecessary, so that the write-in processing can be accelerated.

According to a third aspect of the present invention, there is provided data processing system comprising a connecting portion containing a plurality of blocks and so constructed to be connectable to a block erasing type memory device capable of erasing collectively stored data in units of one block and a formatting portion for formatting the block erasing type memory device by writing format information for substantially coinciding integer ones of the blocks, for example, one block with a cluster into the block erasing type memory device through the connecting portion.

According to this system, the cluster includes integer ones of the blocks. Thus, the data erasing and write-in processings can be carried out in units of one block. Therefore, the necessity of saving other data for data write-in processing is eliminated, so that the data erasing and write-in processing can be accelerated.

To correspond the cluster with the block, it is permissible to write information for corresponding the size of the cluster with the size of the block and position adjusting information for coinciding the start position and end position of each cluster with the start position and end position of each block into the block erasing type memory device.

The aforementioned data processing system may further comprise a section for recording directory information indicating a file name and head memory position and a file allocation table indicating a file positioning a cluster.

These information items are updated each time when data write-in or erase processing is carried out. Because in such a system, these information items are stored in a single block, the necessity of saving other data for updating these data is eliminated. Thus, the data write-in or erase processing can be accelerated.

The aforementioned formatting portion may include an erasing portion for physically erasing stored data of blocks other than a block in which the format information is written.

In general memory medium, it is possible to assume that data has been erased by replacing a particular portion of data with a particular code, without physically erasing data.

However, in the block erasing type memory device, according to such data erasing method, a processing for erasing the original data or the like is needed at the time of data write-in processing, so that the processing takes long time. Because according to the present invention, data in the data region is physically erased upon formatting, the write-in processing can be accelerated.

In erasing a file written in the block erasing type memory device also, it is preferable that data of a block including that appropriate data is physically erased.

The aforementioned data processing system further comprises a format information readout portion for reading out the format information through the connecting portion, a cluster determining portion for determining a size and position of a cluster serving as a minimum unit of a file according to format information read out by the format information readout portion and a control portion for controlling erasing, write-in and readout of data of the block erasing type memory device according to the size and position of a cluster determined by the cluster determining means.

With such components, the data erasing, write-in processing and the like can be accelerated.

A program for making the computer to execute the above described data processing system and function may be stored in a memory medium and distributed, and installed in the computer so as to carry out the above described operation on the computer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, the embodiment of the present invention will be described with reference to the accompanying drawings.

Figure 1:
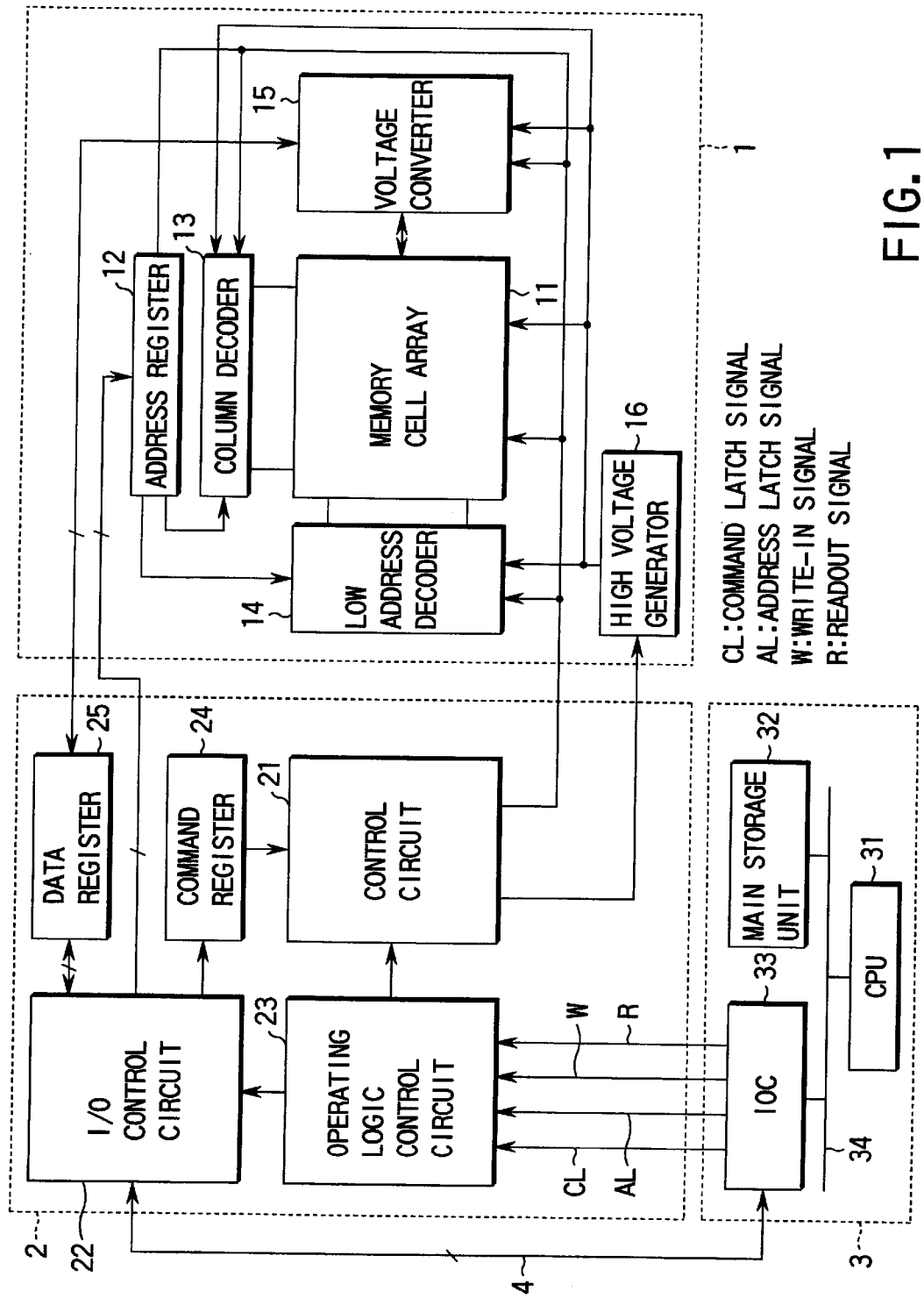
FIG. 1 is a block diagram showing a structure of a memory control system of a flash memory according to a first embodiment of the present invention.

FIG. 1 is a block diagram showing a structure of a memory control system of a flash memory according to a first embodiment of the present invention.

As shown here, this memory control system comprises a flash memory 1, a memory control unit (memory controller) 2, a computer 3 and I/O bus 4. The memory control unit 2 is connected to the computer 3 through the I/O bus 4 such as SCSI bus and is removable from the computer 3.

The flash memory 1 is a block erasing type memory device containing a memory cell array 11, an address register 12, a column decoder 13, a low address decoder 14, a voltage converting circuit (voltage converter) 15 and a high voltage generating circuit (high voltage generator) 16.

The memory cell array 11 is constituted of a plurality of memory regions each having a memory capacity of 1 byte. These memory regions are arranged in matrix of 16384 rows×528 columns, and therefore the entire memory cell array has a memory capacity of about 8.65 M byte.

Figure 2:
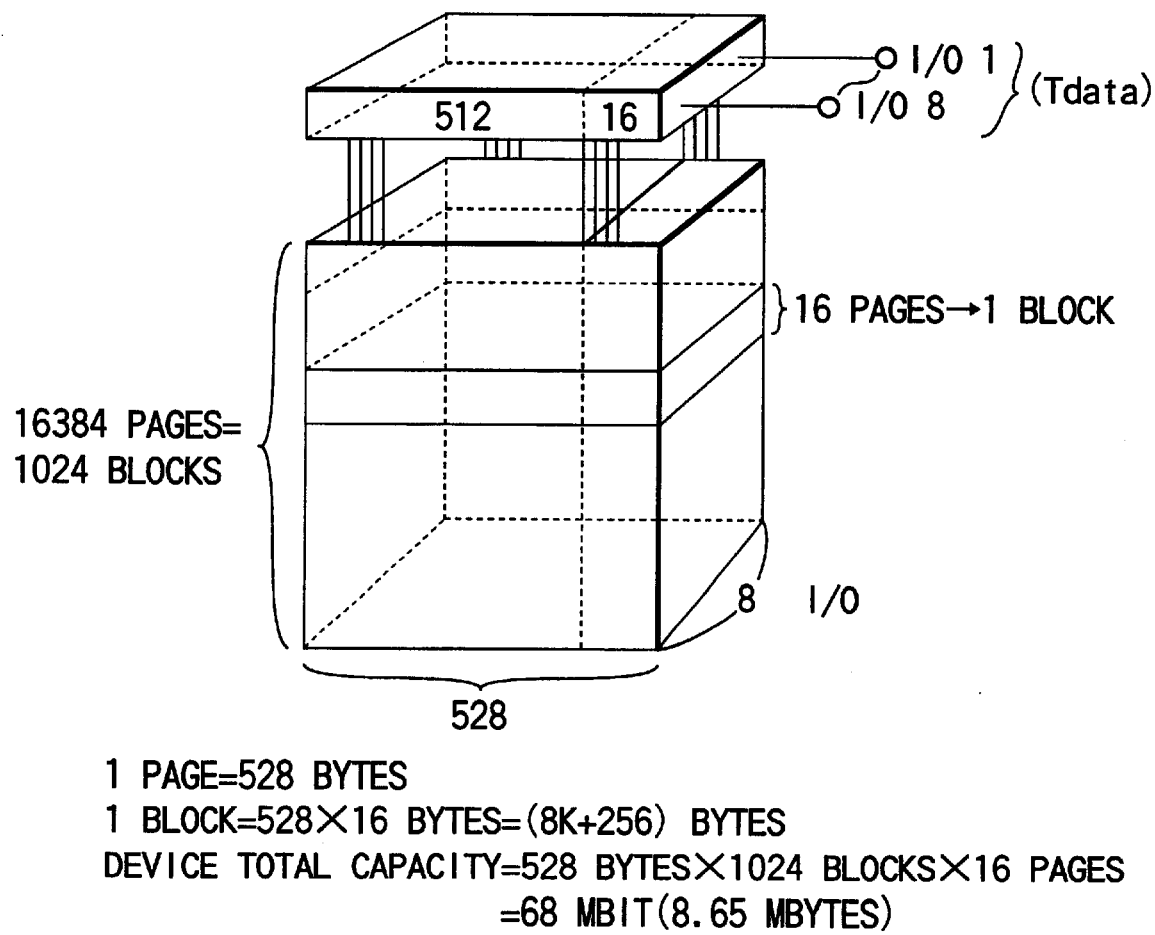
FIG. 2 is a schematic diagram showing a structure of the flash memory.

Each row of the memory cell array 11 forms a page having a memory capacity of 528 byte as shown in FIG. 2. Respective memory regions contained in each page are supplied with a column address continuously from 1 to 528.

Each unit of 16 pages from beginning forms a single block. Each block has a memory capacity of about 8.03 K byte and the entire memory area includes 1024 blocks. Each block is supplied with a block address continuously from 1 to 1024.

Figure 3:
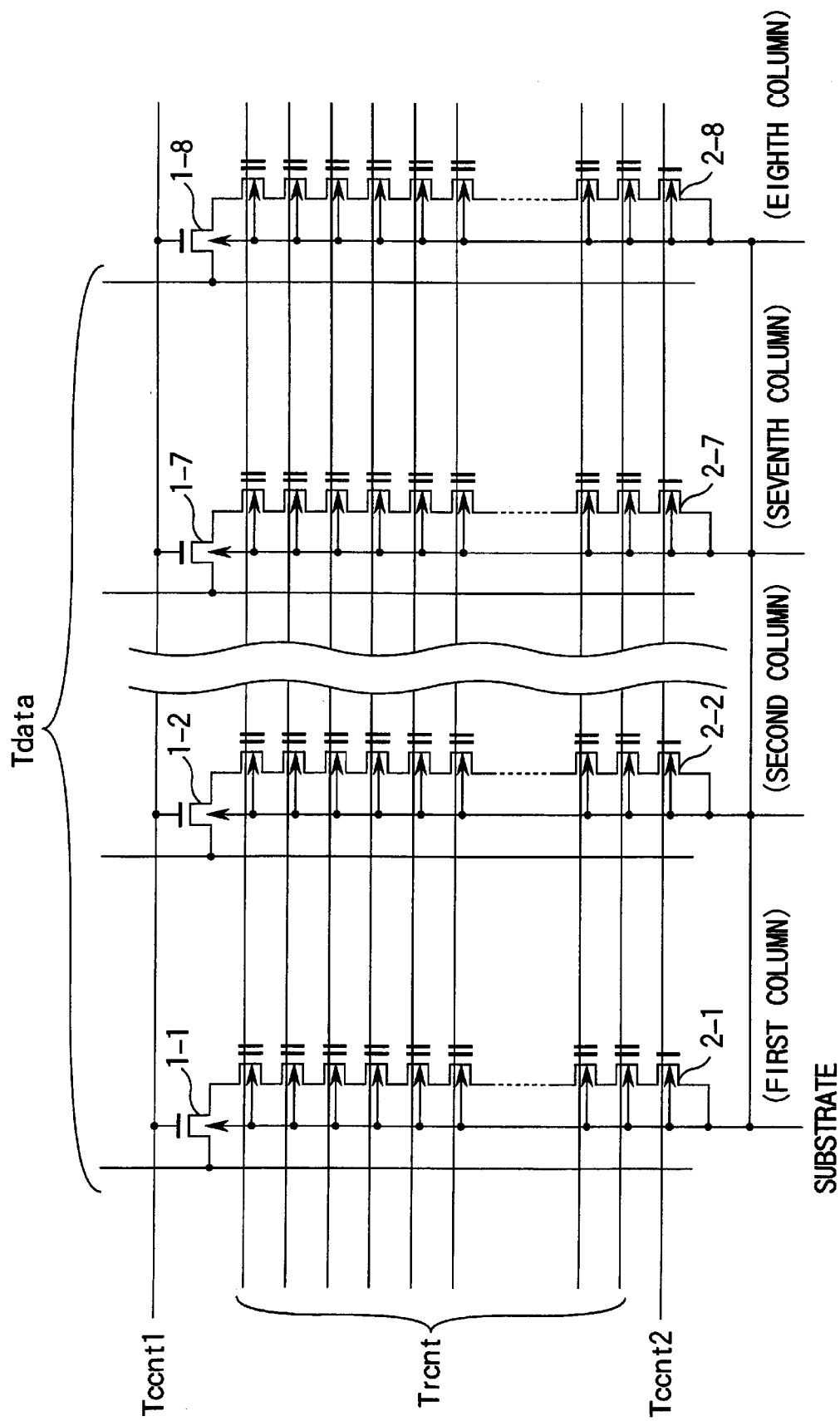
FIG. 3 is a diagram showing a structure of a memory cell array.

Every 16 memory regions belonging to the same block contains memory cells arranged in matrix of 16 rows×8 columns as shown in FIG. 3. These memory cells are of NAND type, formed on a common substrate.

The current path of the memory cell of each column is connected in cascade and the gate of each row is connected to a common row control input terminal (Trcnt). Each row control input terminal Trcnt is connected to a gate of each memory cell belonging to other column of the same page.

A source of FETs (field effect transistors) 1-1 to 1-8 is connected to an end of each current path connected in cascade. A drain of each of FETs 1-1 to 1-8 is connected to data I/O terminal Tdata corresponding to each column and a gate thereof is connected to the common row control input terminal Tccnt1.

A drain of each of column selection FETs 2-1 to 2-8 is connected to the other end of each current path a source of each of the FETs 2-1 to 2-8 is connected to a substrate. A gate of each of the FETs 2-1 to 2-8 is connected to a common column control input terminal (Tccnt2).

The column control input terminals Tccnt1 and Tccnt2 are connected to the gates of the row selection FETs 1-1 to 1-8 and FETs 2-1 to 2-8 connected to respective memory cells belonging to the same row of the flash memory array 11.

Each memory cell carries out write-in of data on the data I/O terminal Tdata, reading to the data I/O terminal Tdata and erasing of the memory according to a voltage applied to the row control input terminal Trcnt, column control input terminal Tccnt1, Tccnt2 and substrate. As described later, in the memory cell array 11 generally, data write is carried out in units of one page, data read is carried out in units of one byte and data erasing is carried out in units of one block.

Because each memory cell is of NAND type, data recording cannot be carried out but in a direction from "1" to "0" in a recorded value. A bit in which a recorded value of the memory cell is "0" keeps a state of "0" until the recording content is reset (erasing in units of one block).

The address register 12 is connected to the column decoder 13, low address decoder 14 and memory control unit 2.

The address register 12 receives 3-byte information indicating column address and page address of the memory cell array 11 from the memory control unit 2 by each byte and stores it. Of the stored information, column address information is outputted to the column decoder 13 and page address information is outputted to the low address decoder 14.

Column address information is inputted from the address register 12 to the column decoder 13. According to inputted column address information and an instruction of the control circuit (controller) 21, write-in voltage, erasing voltage, readout voltage or readout inhibiting voltage generated by a high voltage generator 16 is applied to each row control input terminal Trcnt.

Page address information is inputted from the address register 12 to the low address decoder 14. According to that information and an instruction of the control circuit 21, forward bias voltage or reverse bias voltage generated by the high voltage generator 16 is applied to respective column control input terminals Tccnt1, Tccnt2.

The voltage converter 15 receives data to be written into the memory cell array from data register 24 and a voltage indicating each bit of that data is converted to a predetermined write-in voltage. Then, this write-in voltage is applied to the data I/O terminal Tdata according to an instruction of the control circuit 21. When data is read from the memory cell array 11, the voltage converter 15 fetches a voltage indicating a content of each memory cell from the data I/O terminal Tdata, amplifies that voltage and then stores it in the data register 24.

According to an instruction of the control circuit 21, the high voltage generator 16 generates a write-in voltage to be applied to each row control input terminal Trcnt, write inhibiting voltage to be applied to each data I/O terminal Tdata, erasing voltage to be applied to the substrate and forward bias voltage and reverse bias voltage to be applied to the column control input terminals Tccnt1, Tccnt2 of each column. A generated voltage is supplied to a substrate of the memory cell array 11, column decoder 13 and low address decoder 14.

The memory control unit (memory controller) 2 shown in FIG. 1 comprises the control circuit 21, I/O control circuit 22, operating logic control circuit 23, command register 24 and data register 25. The memory control unit 2 transfers data between the flash memory 1 and a main storage unit 32.

The control circuit 21 controls the column decoder 13, low address decoder 14, voltage converter 15 and high voltage generator 16 as described later, according to a command stored in a command register 24 and an instruction of the operating logic control circuit 23.

The I/O control circuit 22 is connected to the data bus of the flash memory 1, I/O bus 4, operating logic control circuit 23, command register 24, address register 12 and status register 28.

The I/O control circuit 22 fetches in data from the data register 25 and I/O bus 4 according to an instruction of the operating logic control circuit 23 and outputs data to the address register 12, command register 24, data register 25 and I/O bus 4.

The operating logic control circuit 23 is connected to a CPU 31 which will be described later, I/O control circuit 22 and control circuit 21.

The operating logic control circuit 23 receives a command latch signal, address latch signal, write-in signal and read-out signal from the CPU 31 and according to these signals, controls the control circuit 21 and I/O control circuit 22 as will be described later.

The command register 22 stores command information received from the I/O control circuit 22 and outputs to the control circuit 21.

The data register 25 has a memory capacity of 528 bytes and stores data of a write-in object received from the I/O control circuit 22 and outputs to the voltage converter 15. Further, it fetches data outputted from the voltage converter 15 as a result of read-out from the memory cell array 11 and outputs to the I/O control circuit 22.

The computer 3 comprises a CPU (central processing unit) 31, main storage unit 32 and IOC (I/O control unit) 33, each connected through a system bus 34 made of VME bus. The computer 3 is connected to the I/O bus 4 through an IOC 33.

The CPU 31 executes a program stored in the main storage unit 32. The CPU 31 outputs a command for executing a program shown in a flow chart described later corresponding to an operation of an input device (not shown) like a key board, connected to the computer 3 through the I/O bus 4. It outputs a command for executing a program shown in a flow chart described later.

The main storage unit 32 stores a file to be stored in the flash memory and a file to be read from the flash memory 1 as well as processing program of the CPU 31.

The main storage unit 32 stores master boot record to be recorded in boot region when the flash memory 1 is formatted, partition record and an address conversion table which will be described later.

The IOC 33 is an I/O controller for controlling an output of data from the CPU 31 or main storage unit 32 of the computer 3 to the I/O bus 4 and input of the opposite direction processing. Logical structure of memory region of the memory cell array 11

The memory cell array 11 is formatted according to an operating system (OS) used by the computer 3, for example, MS-DOS (Microsoft's trade name) and particularly formatted in such a manner that a block of a physical structure of the memory cell array 11 coincides with a cluster of a logical unit of a file managed by OS.

Each cluster is supplied with a number beginning with "1" and this number does not always agree with an order of the block from a head address of the memory cell array 11.

Figure 4:
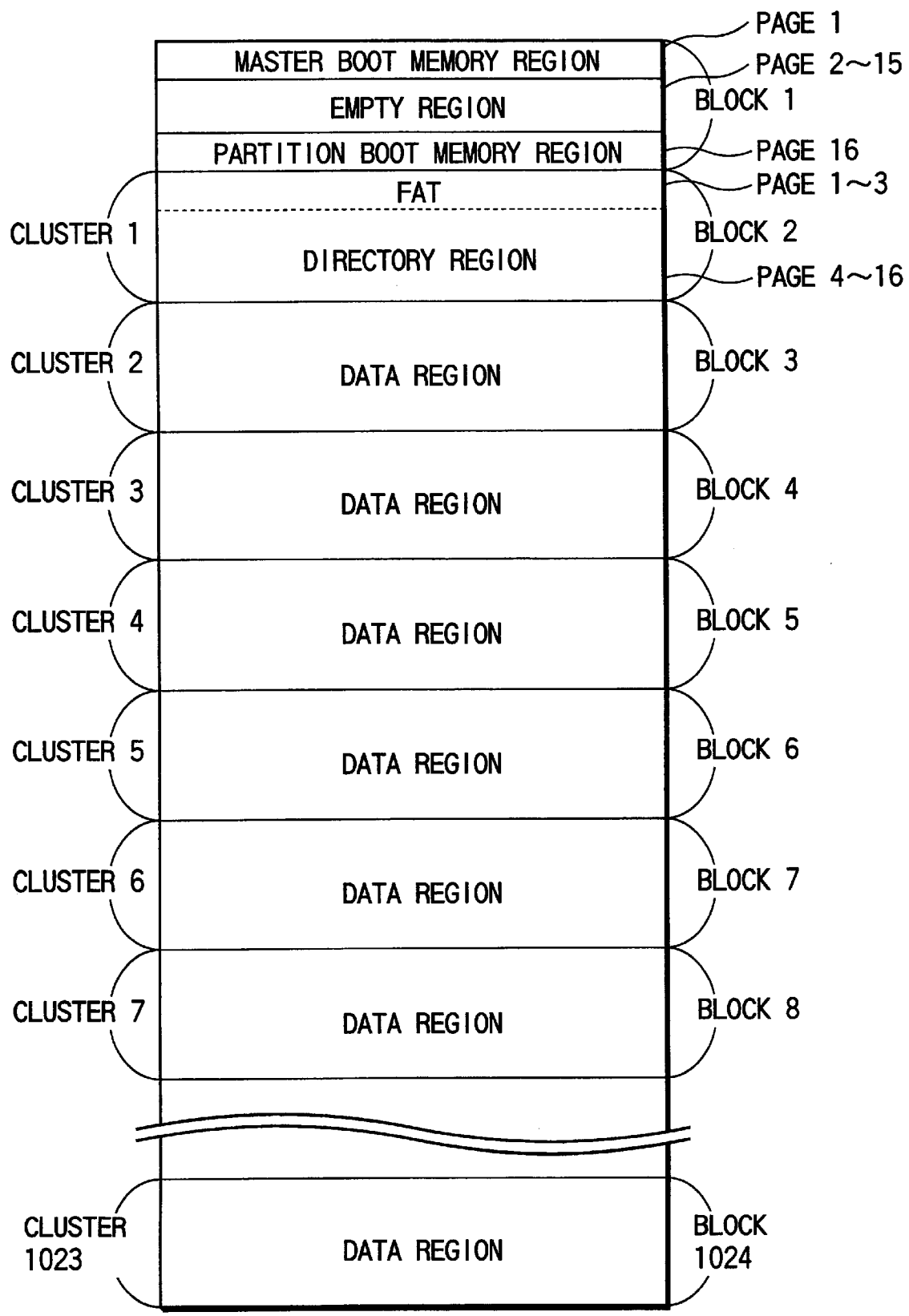
FIG. 4 is a diagram showing a relation between a block and cluster in the format of the flash memory according to the first embodiment of the present invention.

In the initial state in which the memory cell array 11 is formatted, as shown in FIG. 4, the memory region of the memory cell array 11 is divided to master boot memory region (master boot memory region), empty region (empty region), partition boot memory region (partition boot memory region), FAT (file allocation table), directory region and file region.

Of these regions, the master boot memory region, empty region, and partition boot memory region are allocated at a head block of the memory cell array 11.

The master boot memory region includes a first page (first sector) of a head and a region for recording information about processing of startup and information of each partition provided on this memory (each virtual memory in a case when this memory is divided to one or more virtual memories).

Information about each partition includes information, for example, of whether or not each partition is to be started and further includes following information.
(1) Position of a beginning page of each partition
(2) Position of an end page of each partition
(3) Total pages included in each partition The empty region has 14 pages following the master boot memory region. The empty region is provided for coinciding a head and end of the block which is a physical unit with those of a cluster which is a logical unit managed by the OS when the memory region is divided to a plurality of clusters.

The partition boot memory region has a page following the empty region. The partition boot memory region stores information about a structure of each partition and information about processing for startup. The information about the structure of each partition has a following content.
(4) Memory capacity of a page contained in each partition
(5) Number of pages for consisting a single cluster
(6) Maximum number of directories which each partition is capable of containing
(7) Number of pages occupied by FAT
(8) Number of FATs The cluster is a unit of memory consisting of a specified number of pages which are defined in the partition boot memory region and a minimum unit of memory in which a content of a file managed by the OS is recorded. Therefore, different file contents are never contained in a cluster.

According to this embodiment, it is defined that each cluster has 16 pages so as to coincide the sizes of the block and cluster with each other.

The blocks 2 to 1024 form data region for storing arbitrary data, file and the like.

FAT and directory are stored in any of the data regions (block 2 in the initial condition). The FAT is stored in head three pages of 16 pages in a block and the directory is stored in the remaining 13 pages.

The FAT is a table indicating an allocation of the file. The directory includes information about a name of a stored file and a number of a cluster in which a head of the file is stored, and the like.

To coincide the size and position of the block which is a physical unit of the memory cell 11 with those of the cluster managed by the operating system (OS) of the computer 3, concretely, for example, following values are stored in the master boot memory region and partition boot region.

(1) Position of a beginning page of each partition=1
(2) Position of an end page of each partition=16384
(3) Total number of pages contained in each partition=1
(4) Memory capacity of a page contained in each partition= 512 bytes
(5) Number of pages composing a cluster=16
(6) Maximum number of directories which each partition is capable of containing=256
(7) Number of pages occupied by FAT=3
(8) Number of FATs=1

Figure 5:
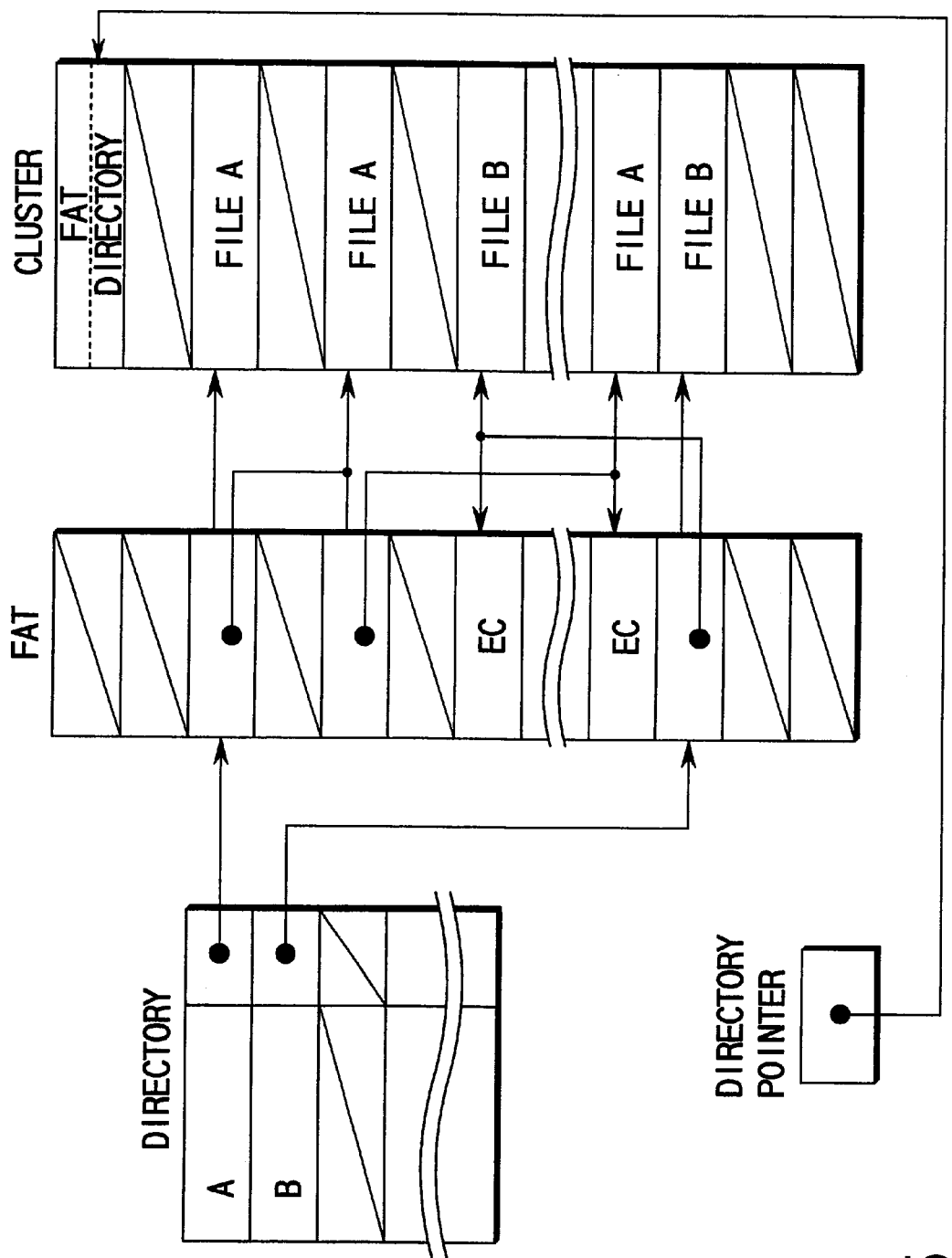
FIG. 5 is a diagram showing a correspondence among directory, file allocation table and cluster in the first embodiment of the present invention.

FIG. 5 is a diagram showing a relation between FAT, directory and cluster.

As shown in the same Figure, the number of a cluster in which the FAT and directory are stored is indicated by a pointer in a memory portion 21a of the control circuit 21.

The directory points out a file name of a file stored in the memory cell array 11 and a cluster in which a head portion of that file is stored with a pointer.

When a file cannot be contained in a file, the FAT points out a cluster for storing the following portion. A cluster in which the final portion of the file is stored is indicated by an end cord (EC). Address conversion table The address conversion table is a table for storing information indicating the number of a cluster allocated for each block. As described previously, the address conversion table is stored in the main storage unit 32 of the computer 3 and accessed by the CPU 31 and updated.

Figure 6:
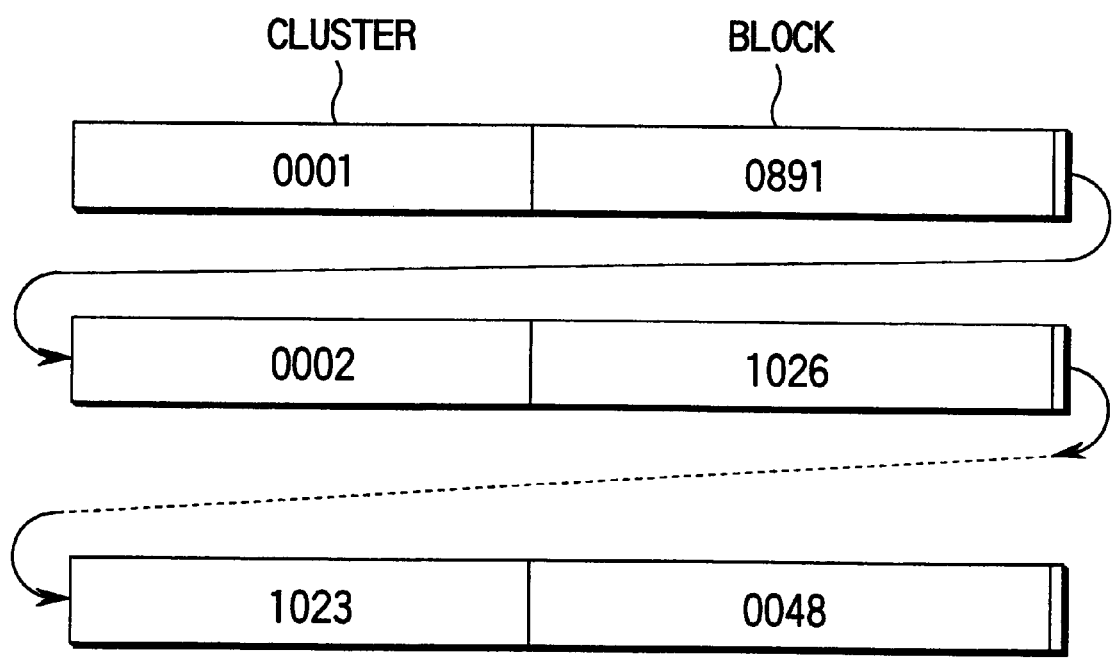
FIG. 6 is a diagram showing an example of a structure of an address conversion table.

FIG. 6 shows an example of a structure of the address conversion table. The address conversion table comprises a plurality of records. A cluster number beginning with "1" is stored at the head of each record and a block number corresponding to that number is stored.

The number "1" is always allocated to a block in which the FAT is stored as a cluster No. The number "I" of the cluster is updated by a processing described later so as to indicate a block in which the FAT is to be newly stored.

Basic Operation of the Flash Memory and Memory Control Unit

Figure 7:
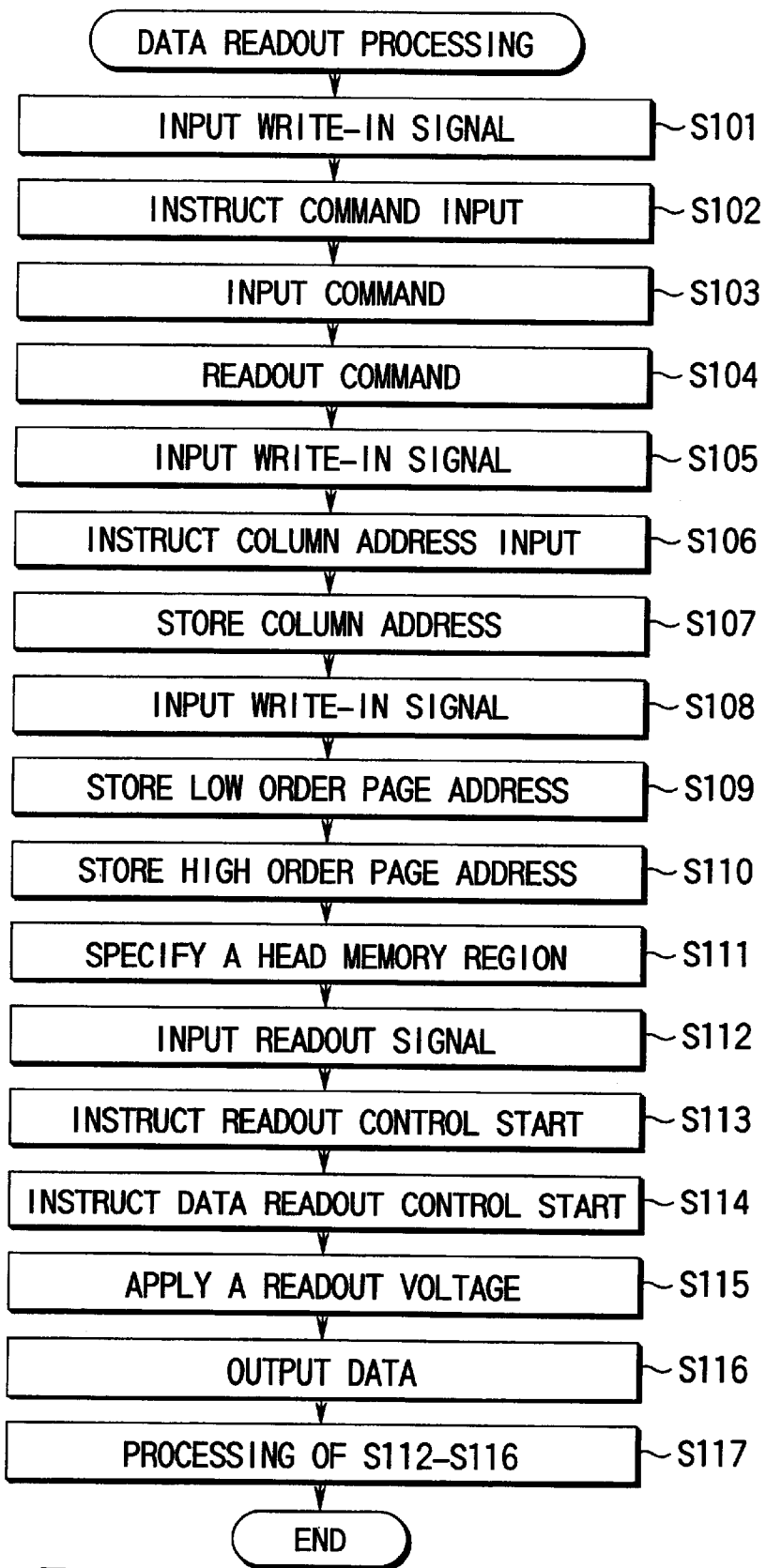
FIG. 7 is a flow chart showing data read-out operation of the first embodiment of the present invention.
Figure 8:
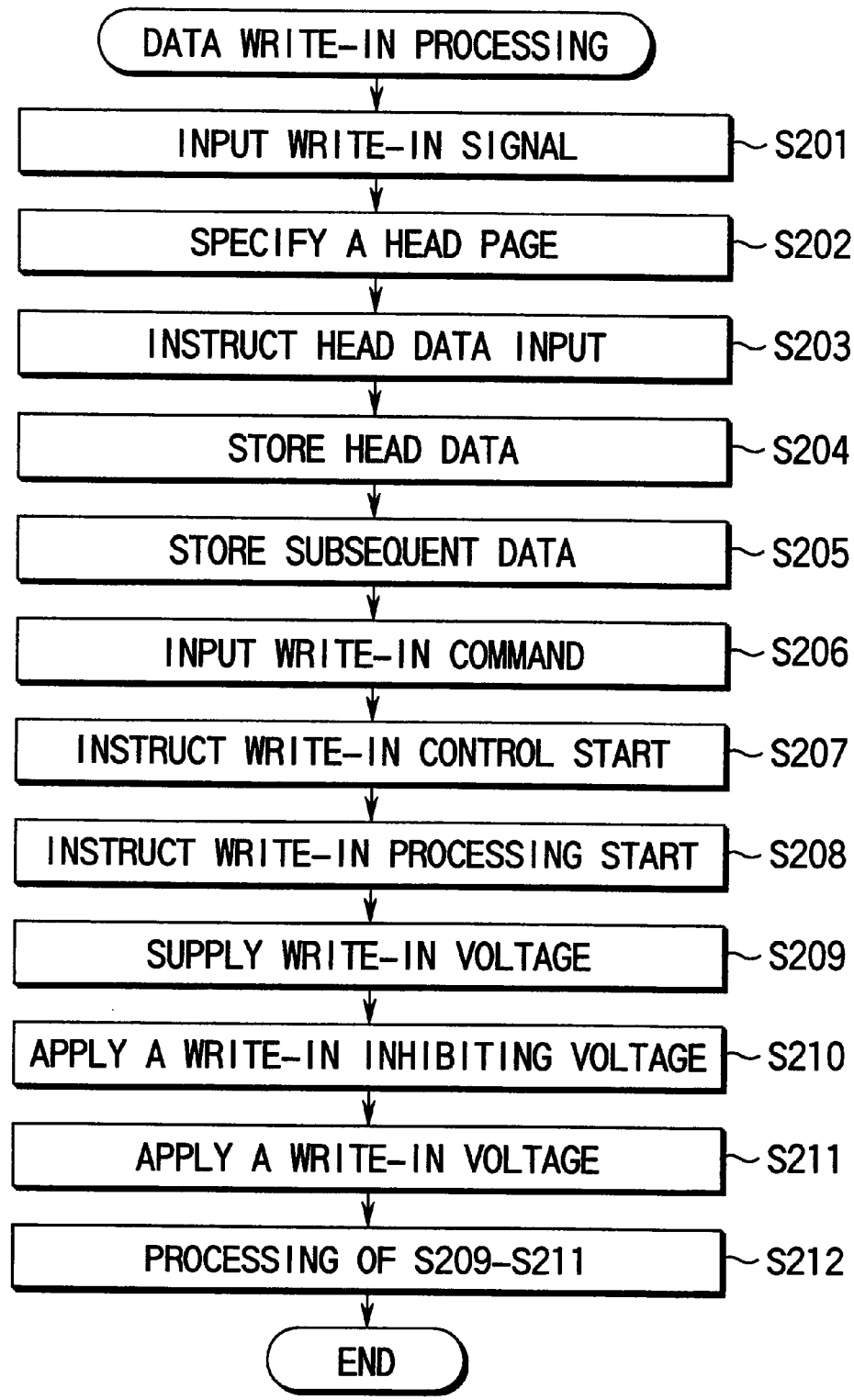
FIG. 8 is a flow chart showing data write-in operation of the first embodiment of the present invention.
Figure 9:
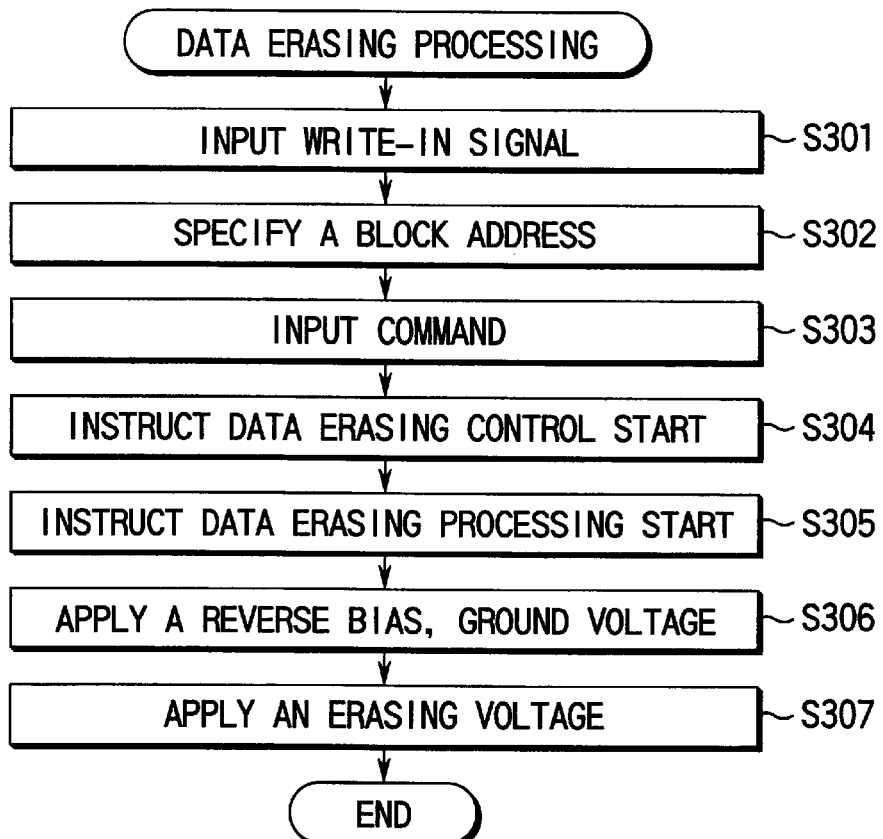
FIG. 9 is a flow chart showing data erasing operation of the first embodiment of the present invention.

Next, the basic operation for data readout, write-in and erasing with the flash memory 1 and memory control unit 2 will be described with reference to a flow chart of FIGS. 7 to 9.

Readout

Following three types of readout mode are available. In the first readout mode shown in FIG. 7, the command latch signal is on active level and it is started if a write-in signal is inputted to the operating logic control circuit 23 with command "00H" indicating a first readout mode being inputted to the I/O control circuit 22 through the I/O bus 4 (step 101, a numerical value having "H" at its end expresses hexadecimal number).

If the write-in signal is inputted, the operating logic control circuit 23 instructs the I/O control circuit 22 to input a command (step S102) and the I/O control circuit 22 receiving the instruction stores command "00H" in the command register 24 (step S103).

If the control circuit 21 reads a content of the command register 24 (step S104), the control circuit 21 detects a start of the first readout mode.

Next, the command latch signal is released and instead, the address latch signal is made to active level. A signal indicating a column address is inputted to the I/O bus 4. If the write-in signal is inputted again in this condition (step S105), the operating logic control circuit 23 instructs the I/O control circuit 22 to input an address (step S106). The I/O control circuit 22 receiving such an instruction stores a column address in the address register 12 (step S107).

Next, a low order page address signal specifying low order 8 bits of the page address is inputted to the I/O bus 4 in the condition that the address latch signal is kept in active level (step S108). If the write-in signal is inputted again in this condition, the operating logic control circuit 23 instructs the I/O control circuit 22 to input an address. The I/O control circuit 22 receiving such an instruction stores a low order page address in the address register 12 (step S109).

Next by the same processing as steps S108 to S109, a high order page address specifying a high order 5 bits of the page address is stored in the address register 12 (step S110).

The address register in which the column address and page address information items are inputted through above three times inputs the column address to the column decoder 13 and then block address and page address to the low address decoder 14 (step S111). As a result, the column decoder 13 and low address decoder 14 specify a memory region at the head of an readout object.

If the readout object is specified, the address latch signal is released and the readout signal is inputted (step S112). The operating logic control circuit 23 in which the readout signal is inputted instructs the control circuit 21 to start a start of data readout control (step S113).

The control circuit receiving such an instruction instructs the column decoder 13, low address decoder 14 and high voltage generator 16 to start an operation for reading data (step S114).

The column decoder 13 receiving such an instruction applies a sufficiently deep forward bias to the column control input terminals Tccnt1, Tccnt2. In this condition, the low address decoder 14 applies a predetermined readout voltage to the column control input terminal Tccnt connected to a gate of each memory cell forming a memory region of a readout object and a predetermined read-out inhibiting voltage to the other row control input terminal Tccnt (step S115).

Consequently, data of 1 byte stored in the memory region of the readout object is outputted to each data I/O terminal Tdata. That data is outputted to the I/O bus 4 through the data register 25 and I/O control circuit 22 after its voltage value is converted by the voltage converter 15 (step S116).

Each time when the readout signal is inputted to the operating logic control circuit, the storage content in following memory regions is outputted successively by each byte to the I/O bus through the same processing as steps S112 to S116 (step S117).

The second readout mode is started by the write-in signal when the command "01H" indicating the second readout mode is inputted in the I/O control circuit 22 by the I/O bus 4 at the aforementioned step S101.

The second readout operation is different from the first readout mode in that a head position read out is an address 256 ahead of a position indicated by the column address or page address inputted through the I/O bus 4. The other operation is the same as the first readout mode.

The third readout mode is started by the write-in signal when the command "50H" indicating the second readout mode is inputted to the I/O control circuit 22 by the I/O bus 4 at the aforementioned step S101.

In the second readout mode operation, a head position read out is an address 512 ahead of a position indicated by the low order 4 bits of the column address and page address inputted from the I/O bus 4. Further, after data of the memory cell of a final column of each page is read, if a readout signal is further inputted, readout from a 513th memory cell of a next page is carried out. Memory cells following 513th one of each page are objects of readout. The other operation is the same as the first readout mode.
Write-in An operation for data write-in shown in FIG. 8 is carried out as described below, when an address of a write-in object page is specified, data of a page is written into the data register 25 and then data in the data register is written successively into a specified page.

The write-in processing is started when a write-in signal is inputted to the operating logic control circuit 23 in the condition that the command "80H" indicating data output to the data register is inputted to the I/O control circuit 22 while the command latch signal is active level (step S201).

After the processing is started, the column decoder 13 and low address decoder 14 specify a column address and a page address indicating a position of head of a write-in object page in the same processing as steps S102 to S111 in data read-in processing (step S202).

If the address latch signal is released after the processing of the step S202 is terminated and then a write-in signal is inputted to the operating logic control circuit 23, the operating logic control circuit 23 instructs the I/O control circuit 22 to input data (step S203).

The I/O control circuit 22 in which such an instruction is inputted stores data outputted to the I/O bus 4 at an address of a head of the data register 25 (step S204).

The control circuit 21, I/O control circuit 22 and operating logic control circuit 23 carry out the same processing as steps S203 to S204 and stores write-in data at a following address of the data register 25 (step S205). Total amount of data to be written in must be within a single page, namely less than 528 bytes.

If all write-in object data are stored in the data register 25, the command latch signal is made to active level and the command "10H" instructing to write the storage content of the data register 25 into a write-in object page is inputted to the I/O bus 4 (step S206).

If the write-in signal is inputted to the operating logic control circuit 23 under this condition, the operating logic control circuit 23 instructs the control circuit 21 to start data write-in control (step S207).

A control circuit 221 receiving such an instruction instructs the column decoder 13, low address decoder 14, voltage converter 15, high voltage generator 16 and data register 25 to start data write-in operation (step S208).

The high voltage generator 16 receiving such an instruction generates a write-in voltage and supplies it to the low address decoder 14 and then generates a write-in inhibiting voltage and supplies it to the voltage converter 15 (step S209).

The voltage converter 15 reads 1 byte data stored at a head address of the low address decoder 14. The write-in inhibiting voltage inputted from the high voltage generator 16 is applied to the data I/O terminal Tdata corresponding to a bit the logical value of which is "1" and on the other hand, ground voltage is applied to the data I/O terminal Tdata corresponding to a bit the logical value of which is "0" (step S210).

Next, the column decoder 13 applies a sufficiently deep forward bias to the column control input terminal Tccnt1 which is a memory region for a page specified at step S202 and applies a sufficiently deep reverse bias to the column control terminal Tccnt 2. Further, the low address decoder 14 applies a write-in voltage inputted from the high voltage generator 16 to the row control input terminal Trcnt which is a page specified at step S202 (step S211).

At this, if ground voltage is applied to a current path of an appropriate memory cell, the memory value of the memory cell is changed from "1" to "0".

If the processing of step S211 is terminated, following data stored in the data register 25 is successively written into following memory region specified by step S202 through the same processing as steps S209 to S211 (step S212).

Data is written into the memory cell array 11 in the unit of a page by the above described processing.
Erasing An operation for erasing data in a block shown in FIG. 9 is started by inputting a write-in signal into the operating logic control circuit 23 when the command latch signal is on active level and a command "60H" indicating a load of address of an erasing object block is inputted to the I/O control circuit 22 (step S301).

After the processing is started, the address register 12 inputs an address of high order and low order pages by the same processing as steps S102 to S111 in data read-in processing. High order 9 bits of the inputted page address are extracted and a block address indicating a position of the erasing object block is specified (step S302).

If the address of the erasing object block is specified, the command latch signal is made to active level and the command "D0H" instructing to erase the storage content of the erasing object block is inputted to the I/O bus 4 (step S303).

If the write-in signal is inputted to the operating logic control circuit 23, the operating logic control circuit 23 instructs the control circuit 21 to start a control for erasing data of the specified block (step S304). The control circuit 21 receiving this instruction instructs the column decoder 13, low address decoder 14 and high voltage generator 16 to start the processing for erasing data (step S305).

The column decoder 13 receiving such an instruction applies a sufficiently deep reverse bias to all row control input terminals Tccnt1 and Tccnt2 of the memory cell array 11. The low address decoder 14 applies ground voltage to the row control input terminals Trcnt of all pages belonging to a block specified by step S302 (step S306).

In this condition, the high voltage generator 16 generates an erasing voltage and this erasing voltage is applied to a substrate of the memory cell array 11 (step S307). As a result, the memory values of all the memory cells belonging to the appropriate block turn to "1". By the above described processing, data stored in the memory cell array 11 is erased in units of one block.
Format Processing of the Flash Memory 1

Next, the format processing of the flash memory 1 as shown in FIG. 4 will be described with reference to a flow chart of FIG. 10. This processing is started by user's instructing to start the format by operating such an input device (not shown) as a keyboard connected to the computer 3.

The flash memory 1 and memory control unit 2 execute the above described erasing operation, namely the operations of steps S301 to S306 in order to erase each block and then erase the storage content of each block (step S401). In the processing of step S401, the commands "60H" and "D0H" outputted to the I/O bus 4 are transmitted from the CPU 31 through the system bus 34 and IOC 33.

Next, the CPU 31 executes the format program so as to generate a master boot record, empty area size and partition boot record having the above described content in order to coincide in the size and position the block and sector of the flash memory 1 with each other.

The flash memory 1 and memory control unit 2 execute the above described operation, namely, the operation of steps S201 to S211 to write a master boot record having the above described content by each page from the beginning (step S402). In the processing of step S402, the commands "80H" and "10H" and write-in object data are transmitted from the CPU 31 through the system bus 34 and IOC 33.

Next, the memory control unit 2 empties 14 pages and writes a partition boot record into page 16 of block 1 in the same operation (step S403).

As a result, the master boot region, empty region and partition boot region are formed in the block 1.

Finally, the CPU 31 generates an address conversion table and stores it in the main storage unit 32 (step S404).

In the address conversion table generated in step S404, each cluster and block values are set so that each block number from a head address of the memory cell array 11 coincides with each cluster. That is, the block 2 is set to coincide with cluster 2, and the block 3 is set to coincide with the cluster 3. In the following treatment, matching of the block number or cluster number is performed.

Figure 10:
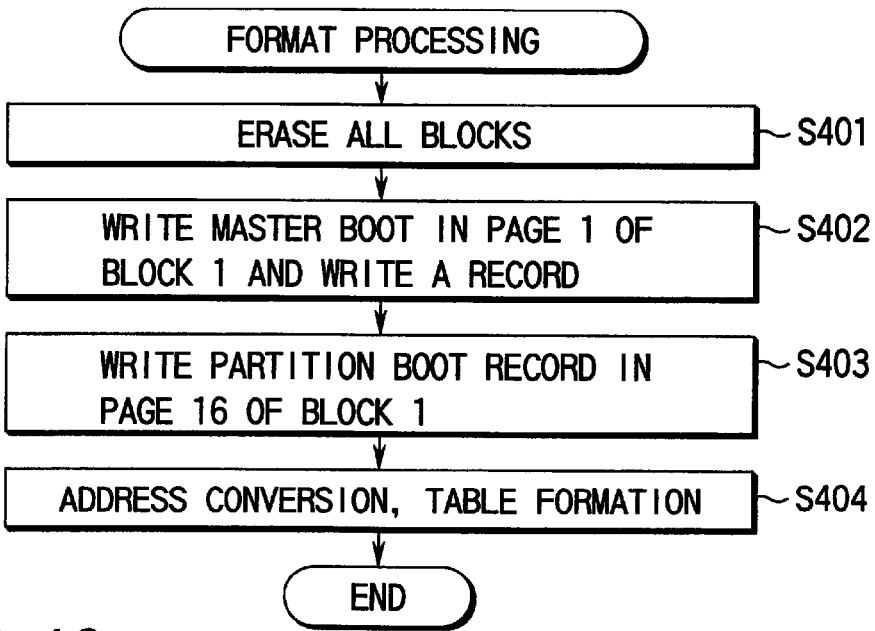
FIG. 10 is a flow chart showing formatting processing of the flash memory according to the first embodiment of the present invention.

Here, the processing of the flow chart shown in FIG. 10 is terminated. As a result, the flash memory 1 is formatted as shown in FIG. 4.

Processing at the Time of Power on

If the power of the computer 3 is turned on, the CPU 31 instructs the memory control unit 2 according to a program stored in an internal ROM (not shown) to read information stored in the master boot region and partition boot region of the flash memory 1 by a first readout mode.

Consequently, the master boot record stored in the first page of the first block is read out from the data I/O terminal Tdata. The read out master boot record is supplied to the CPU 31.

The CPU 31 instructs the memory control unit 2 to read a partition boot record on the first readout mode by the same operation based on the read out master boot record. The read out partition boot record is supplied to the CPU 31. The CPU 31 stores the read out boot information in the main storage unit 32.

The CPU 31 determines a cluster size and a head of the data region according to the readout data. The file access operation is carried out following a definition of these boot information. Therefore, the minimum unit and position of a file at the time of data read-out and write-in become the same size and position of the block of the flash memory 1.

File Erase Processing

Next, processing for erasing a file written in the flash memory 1 will be described with reference to a flow chart shown in FIG. 11.

The file erase processing is started by operating such an input device (not shown) as a key board connected to the computer 3 or a necessity of an application program being executed by the CPU 31.

If the file erase processing is started, the CPU 31 specifies an erase object file (step S501). Next, the CPU 31 specifies a page having FAT and directory (that is, pages after a head of a block in which cluster number "1" is allocated on the address conversion table). The CPU 31 instructs the memory control unit 2 to read out an appropriate page on the first readout mode through the system bus 34, IOC 33 and I/O bus 4. The CPU 31 inputs the storage content of the FAT and directory read out by the memory control unit 2 and stores it in the main storage unit 32 (step S502).

Next, the CPU 31 retrieves the FAT and directory stored in the main storage unit 32 and specifies a cluster in which a file specified at step S501 is stored. The cluster number is temporarily stored in the main storage unit 32 (step S503).

Next, the CPU 31 analyzes a content of the FAT stored in the main storage unit 32 and selects an empty cluster (step S504). The CPU 31 allocates a cluster number selected at step S504 to a block to which the cluster number "1" is currently allocated and on the other hand, allocates a cluster number selected at step S504 to a block in which FAT is currently stored. According to this change of the allocation, the content of the address conversion table is written (step S505).

Next, the CPU 31 erases information indicating an erasing object file specified at step S501 from the content of the FAT and directory stored in the main storage unit 32 (step S506). As a result, the FAT and directory are updated. Next, the CPU 31 instructs the memory control unit 2 to write the updated FAT and directory into a first empty block. As a result, the memory control unit 2 writes a single page of a head of the updated FAT into a page of a head of an empty block selected at step S504 according to actions of steps S201 to S212 (step S507).

The CPU 31 instructs to write in each time when the write-in operation of the memory control unit 2 is terminated until the updated FAT and directory are all written into the empty block selected at step S504. The memory control unit 2 writes the FAT and directory successively in each of following pages according to actions of steps S201 to S212 each time when an instruction is received (step S508).

Next, the CPU 31 specifies a block corresponding to the number of a cluster stored at step S503 referring to the address conversion table and instructs the memory control unit 2 to erase a storage content of that block. As a result, data stored in that block or an erasing object file is erased by actions of steps S301 to S306 (step S509).

Next, the CPU 31 instructs the memory control unit 2 to erase a storage content of a block in which a FAT and directory before updating exist (step S510). Consequently, the storage content of the block in which the directory and FAT before updating are stored is erased according to actions of steps S301 to S306.

By the aforementioned processings of steps S501 to S510, information indicating an erasing object file is erased from the FAT and directory and the content of that file is also erased. The processing of step S502 may be omitted if the content of the FAT and directory has been read in the main storage unit 32 by a processing executed prior to the processing of steps S501 to S510.

File Write-in Processing

Figure 12:
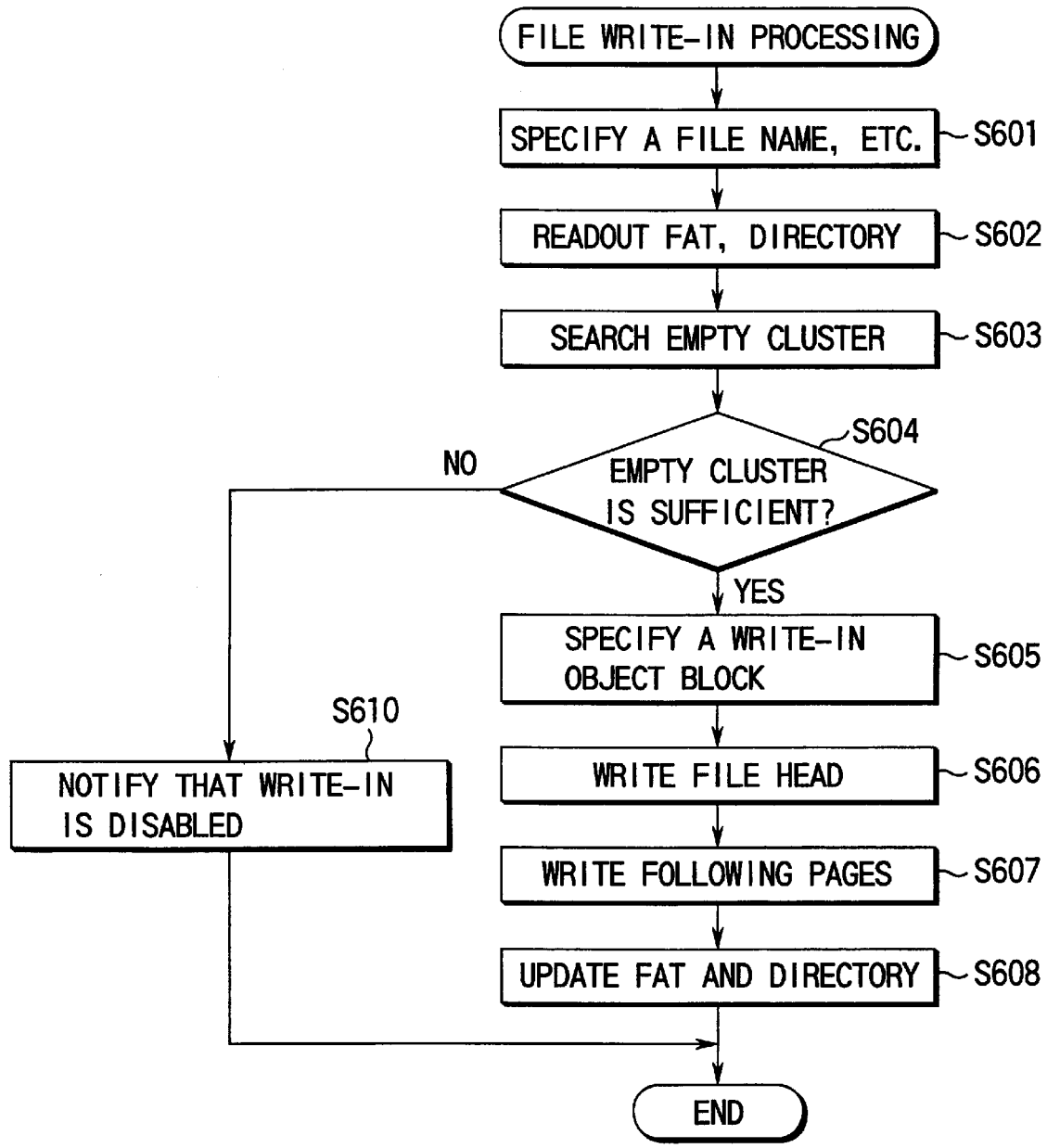
FIG. 12 is a flow chart showing a processing for writing a file into the flash memory according to the first embodiment of the present invention.

A processing for writing a file into the flash memory will be described with reference to a flow chart shown in FIG. 12. The processing of this flow chart is executed by user's operating such an input device (not shown) as a keyboard connected to the computer 3 or necessity of a user program.

After the processing is started, the CPU 31 specifies a file name of a file to be written, a head address and data amount (step S601). Because the CPU 31 is operated according to the aforementioned format information, the data amount is integer times a block.

Next, the CPU 31 specifies a block in which the FAT and directory exist by referring to the address conversion table, instructs the memory control unit 2 to read out that block on the first readout mode and then inputs the storage content of the FAT and directory (step S602). By referring to the inputted FAT, an empty cluster in the flash memory 1 is retrieved (step S603).

Next, it is determined whether the number of empty clusters retrieved at step S603 is sufficient for storing a file of data amount specified at step S601, and directory and FAT after updating which will be described later (step S604). If it is determined that the number of empty clusters is not sufficient at step S604, the processing proceeds to that of step S610 described later.

If it is determined that the number of empty clusters is sufficient at step S604, a block necessary for storing a file of data amount specified at step S601 is specified in order from a head of empty clusters retrieved at step S603. The number of each block indicated by each specified cluster is specified by retrieving the address conversion table and a specified block number is temporarily stored in the main storage unit 32 (step S605).

Next, the CPU 31 instructs the memory control unit 2 to carry out write-in operation in order to write a file in a block specified at step S605. As a result, the memory control unit 2 writes a single page of a head of a write-in object file into a page of a head of an empty block retrieved at step S603 (step S606).

The CPU 31 instructs the write-in operation each time when the write-in operation of the memory control unit 2 is terminated until the content of a write-in object file is written into an empty cluster retrieved at step S603. The memory control unit 2 writes a content of a file successively in following pages according to actions of steps S201 to S212 each time when it receives an instruction (step S607). A size of a file to be produced by the CPU 31 is integer times the size of a block. Therefore, a write-in object file is divided equally and stored in a plurality of blocks.

If file write-in operation is terminated, the CPU 31 updates the FAT and directory according to actions of steps S504 to S508 for erase processing (step S608). In processing of step S506, instead of erasing information indicating an erase object file from the FAT and directory stored in the main storage unit 32, information indicating a written file is added. If updating of the FAT and directory is terminated, the processing of this flow chart is terminated.

On the other hand, if it is determined that the number of empty clusters is not sufficient for write-in of a file at step 604, the CPU 31 recognizes that write-in of a file is impossible and terminates processing of this flow chart (step S610).

File Readout Processing

To read out a file from the flash memory 1, the same processing as that conventionally used for reading a file from the flash memory 1 is applied. That is, the CPU 31 specifies a file name of a read-out object file, reads out FAT information and directory information on the first read-out mode and specifies a page in which a file having an appropriate file name is stored according to read-out information. The CPU 31 instructs to read out on the first read-out mode. As a result, the appropriate file is successively read out and supplied to the CPU 31.

In the memory control system according to this embodiment, as described above, the size and position of a block of the flash memory 1 are coincided with the size and position of a cluster which is a minimum unit of a file managed by the OS.

Therefore, plural files are not stored in each block. Therefore, when a file stored in the flash memory 1 is written in, it is not necessary to save data other than erasing object data in the same block in other cluster or erase a block for storing the saved data and the like. Generally, the data write-in speed of the flash memory 1 is higher than data read-out speed and the data erase speed is slower than the data write-in speed. Thus, with such a structure, the write-in processing and erase processing conventionally necessary are not required to be carried out thereby making it possible to accelerate the processing speed.

In general operating system, when a medium is initialized, data is erased not by erasing it physically but replacing a part of existing data with a specific code. However, in the flash memory, when data is written, even if there is left erased data, saving of the data and physical erasing of an appropriate block are necessary thereby decelerating the write-in action. According to this embodiment, data region is physically erased upon formatting. Therefore the erasing processing is not required at the time of write-in, so that the write-in processing can be accelerated.

Further in general operation system, when a file is erased, the entire data actually forming that file is not erased, but by replacing a head one character with a specific code like "CE", that file is handled as an erased file. In the flash memory, even when such erased data is left, saving of the data and physical erasing of an appropriate block are necessary thereby decelerating the write-in action. Because according to this embodiment, the data region is physically erased at the time of formatting, the erasing processing upon write-in is not necessary so that the write-in processing can be accelerated.

Meanwhile, the structure of the flash memory 1 in the memory control system according to this embodiment is not restricted to the above described structure. For example, the entire memory capacity of the flash memory 1 does not have to be 8 M byte, the memory capacity of each memory cell does not have to be 1 byte and the memory capacity of a page does not have to be 528 bytes. Further, the number of pages of each block does not have to be 16.

The flash memory may be of NOR type. The amount of data inputted or outputted once by the flash memory 1 does not have to be 1 byte, for example, may input or output more than 2 bytes all at once.

According to the above described embodiment, upon power on, the format of the flash memory 1 is determined by accessing the boot region. However, it is permissible to make access to the boot region temporarily when the flash memory 1 is accessed, determine that it coincides with a format recognized by the control circuit 21 or CPU 31 and then make access to data.

Although in a format shown in FIG. 4, the FAT and directory are allocated in the same cluster, it is permissible to allocate them separately. In this case, by making a cluster storing the FAT and directory correspond to "1", "2" or other specified number cluster, the positions of the FAT and direction are determined.

Although in the format shown in FIG. 4, only one FAT is allocated, it is permissible to allocate a first copy (FAT1) and a second copy (FAT2) of the FAT following an ordinary disk format.

Although in the format shown in FIG. 4, the boot information and other information like FAT are written in separate blocks, it is permissible to write these information items in the same cluster (block). If such a format structure is applied, the boot information and the like are copied in other empty block accompanied with updating of the FAT. Therefore, the control circuit 21 and CPU 31 store a position of the boot region.

In a case when each cluster has eight pages (4 KB) for example, it is permissible to write the master boot record in page 1 of a sector, keep pages 2 to 4 as empty region, write a partition boot record in page 5, write FAT1 and FAT2 in pages 7 and 8 and write its directory in other cluster. This configuration is effectively available when the FAT and directory size are small, for example, the entire memory capacity is about 1 MB.

In a case when each cluster has eight pages, it is permissible to write the master boot record in page 1 of a sector, keep pages 2 and 3 as empty region, write the partition record in page 4, write FAT1 and FAT2 in pages 5 to 8 and write its directory in other cluster.

In a case when each cluster has 16 pages (8 KB), it is permissible to write the master boot record in page 1 of a sector, keep pages 2 to 9 as empty region, write the partition boot record in page 10, write FAT1 and FAT2 in pages 11 to 16 and write its directory in other cluster. Likewise, it is permissible to write the master boot record in page 1 of a sector, keep pages 2 and 3 as empty region, write the partition boot record in page 4, write FAT1 and FAT2 in pages 5 to 16 and write its directory in other cluster. This configuration is effectively available when the sizes of the FAT and directory are relatively large, for example, when the memory capacity is 8 MB, 16 MB or equivalent.

Even if such a format configuration is employed, because the sizes of the block and cluster are set to the same size and position, unrequired erase processing does not occur, so that the processing can be executed rapidly.

The flash memory 1 does not have to be fixed in the memory control unit 2 but may be removably installed in the memory control unit 2.

Next, the second embodiment will be described. Although according to the first embodiment, the memory control unit 2 carries out formatting of the flash memory 1, erasing of a file, write-in of a file and the like corresponding to a command from the CPU 31, in the second embodiment, the CPU 31 itself is capable of carrying out the operation of the memory control unit 2.

Figure 13:
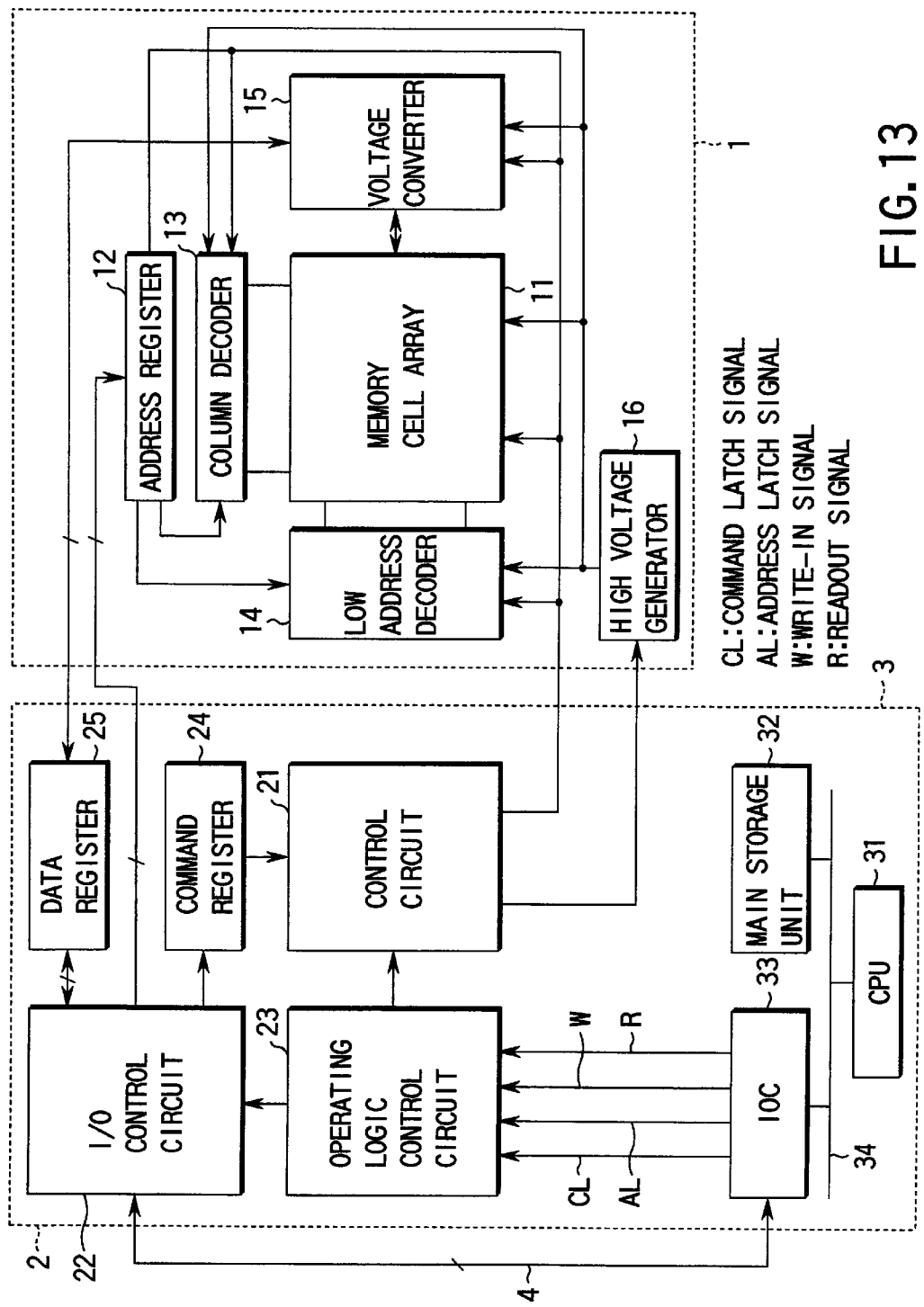
FIG. 13 is a block diagram showing a structure of a memory device according to a second embodiment of the present invention.

In this structure, as shown in FIG. 13 for example, the address register 12, column decoder 13, low address decoder 14, voltage converter 15 and high voltage generator 15 of the flash memory 1 are connected to the IOC 33.

If such a configuration is employed, the CPU 31 itself carries out the operation executed by the memory control unit 2. For example, when the flash memory 1 is formatted, the CPU 31 updates the block address and simultaneously instructs the low address decoder 14, voltage converter 15 and high voltage generator 16 to start the processing for erasing data through the IOC 33 (FIG. 10, step S401). Further, it outputs a write-in object master boot record and partition boot record and instructs the column decoder 13, low address decoder 14, voltage converter 15 and high voltage generator 16 to start the processing for writing these data (steps S402, 403). Then, the address conversion table on the main storage unit 32 is produced (step S404).

The CPU 31 makes access to a head block of the flash memory 1 upon power on, so as to read out boot information, determines a cluster structure (size and position) and controls following access to the flash memory 1 according to this.

For example, in a case when a file is erased, the CPU 31 itself reads out the FAT and directory according to a pointer value (FIG. 11, steps S501, S502) and determines a cluster in which a file to be erased is stored (step S503). The FAT and directory are updated (steps S504 to S508) and a block corresponding to that cluster is erased (step S509). Finally, the CPU 31 erases a block in which FAT and the like before updating are stored (step S510) and terminates the processing.

For example when new data is written, the CPU 31 determines an empty cluster according to the FAT and controls the column decoder 13, low address decoder 14, voltage converter 15 and high voltage generator 16 so as to store data successively in the memory cell array 11. If file write-in is completed, the FAT and directory are updated.

The size of a file generated by the CPU 31 is integer times the block size. Therefore, the file is stored exactly in one or a plurality of blocks. Because the sizes of the FAT and directory are set to the same size as a single block, the FAT and directory are stored exactly in a block. Therefore, it is possible to prevent a small amount of data which is a part of a file or directory from being stored in a part of the block by a single write-in processing so that the file can be erased in units of one block at the aforementioned erasing time.

By CPU 31's controlling the formatting, file erasing and file updating, it is possible to access the flash memory 1 without using any control circuit.

With this structure, if there exist erasing object data and other data mixedly in the same block, the CPU 31 must carry out the processing of saving and erasing a file, so that there is a fear that the operating speed of the entire computer system drops. Because this embodiment employs a format that the class coincides with the block as shown in FIG. 4, unnecessary saving processing and erasing processing can be suppressed, thereby making it possible to raise the processing speed of the entire system.

Figure 14:
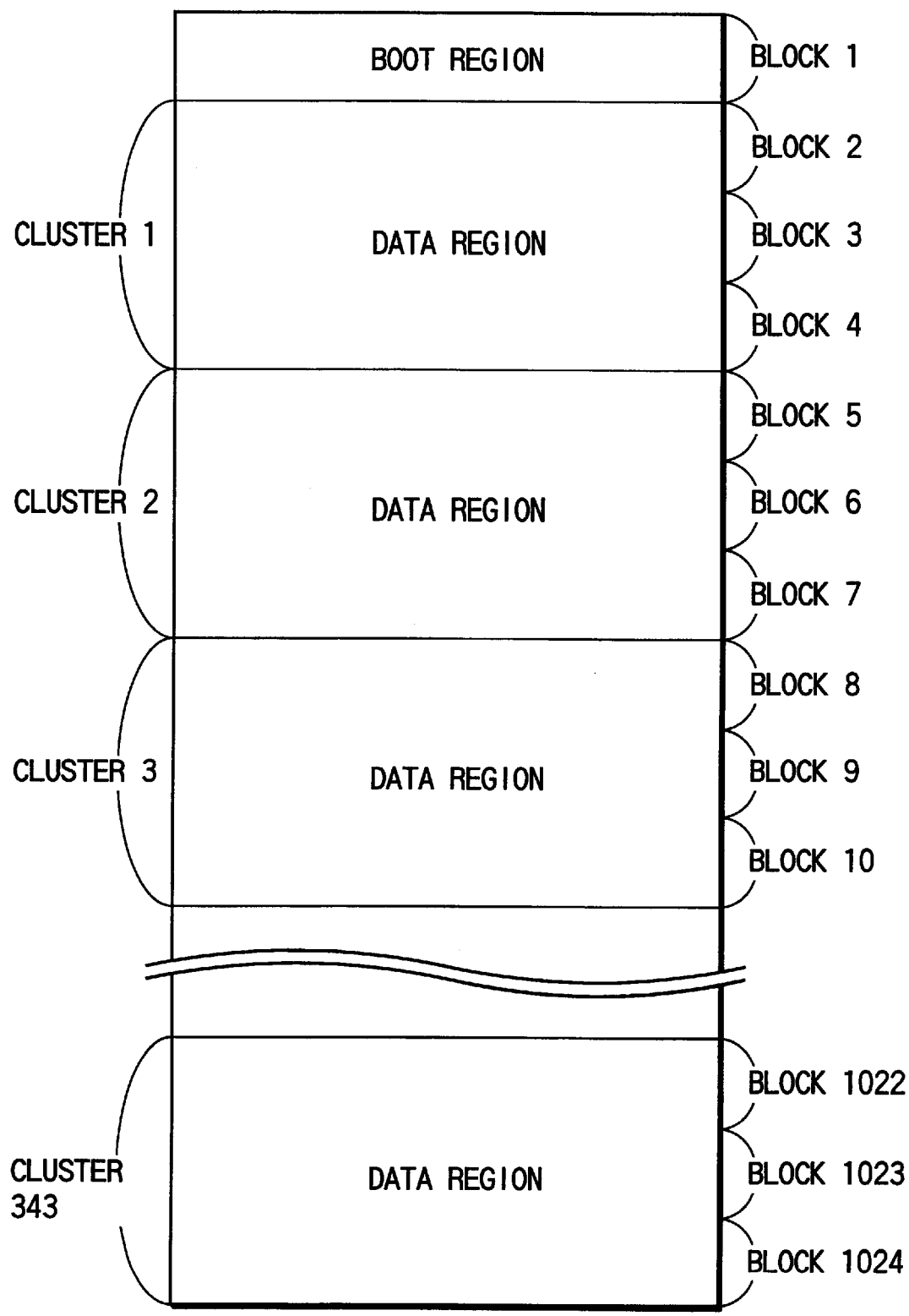
FIG. 14 is a formatting diagram of the flash memory according to a third embodiment of the present invention.

Next, the third embodiment will be described. Although according to the first and second embodiments, the flash memory 1 is formatted so that a single cluster coincides with a single block, according to a third embodiment, the flash memory 1 is formatted so that a single cluster corresponds to a plurality of blocks as shown in FIG. 14.

As shown in the Figure, in this format, the block 1 of the flash memory is boot region, in which the master boot record and partition boot record are stored.

The cluster of the flash memory 1 is specified by data stored in the master boot record and partition boot record in the boot region. In this format, the blocks 2 to 4 of the flash memory 1 correspond to the cluster 1. The blocks 5 to 7 correspond to the cluster 2. The blocks 8 to 10 correspond to the cluster 3. Hereinafter, the blocks 1022 to 1024 correspond to the cluster 343.

The memory control system according to this embodiment and processing thereof are the same as the first and second embodiments. However, when data of a cluster will be erased, this memory control system erases each data of three blocks corresponding to data erasing object cluster. Therefore, the processing of steps S301 to S307 is repeated three times. Although FIG. 14 shows an example in which a cluster corresponds to three blocks, a cluster may correspond to any integer more than 2 blocks.

Next, a fourth embodiment will be described. According to the first embodiment, when the flash memory 1 is formatted, the storage content of all the blocks of the flash memory 1 is erased and then the master boot record and partition boot record are written into the block 1. However, if the boot information is the same between before and after the formatting, such information does not have to be written again. Therefore, the fourth embodiment has proposed a method in which if the boot information is the same between before and after the formatting, the flash memory 1 is formatted without erasing the boot information.

According to the fourth embodiment, the memory control system configuration is the same as the case of FIG. 1. Further, processing of the flash memory 1 other than formatting is the same as the first embodiment.

Figure 15:
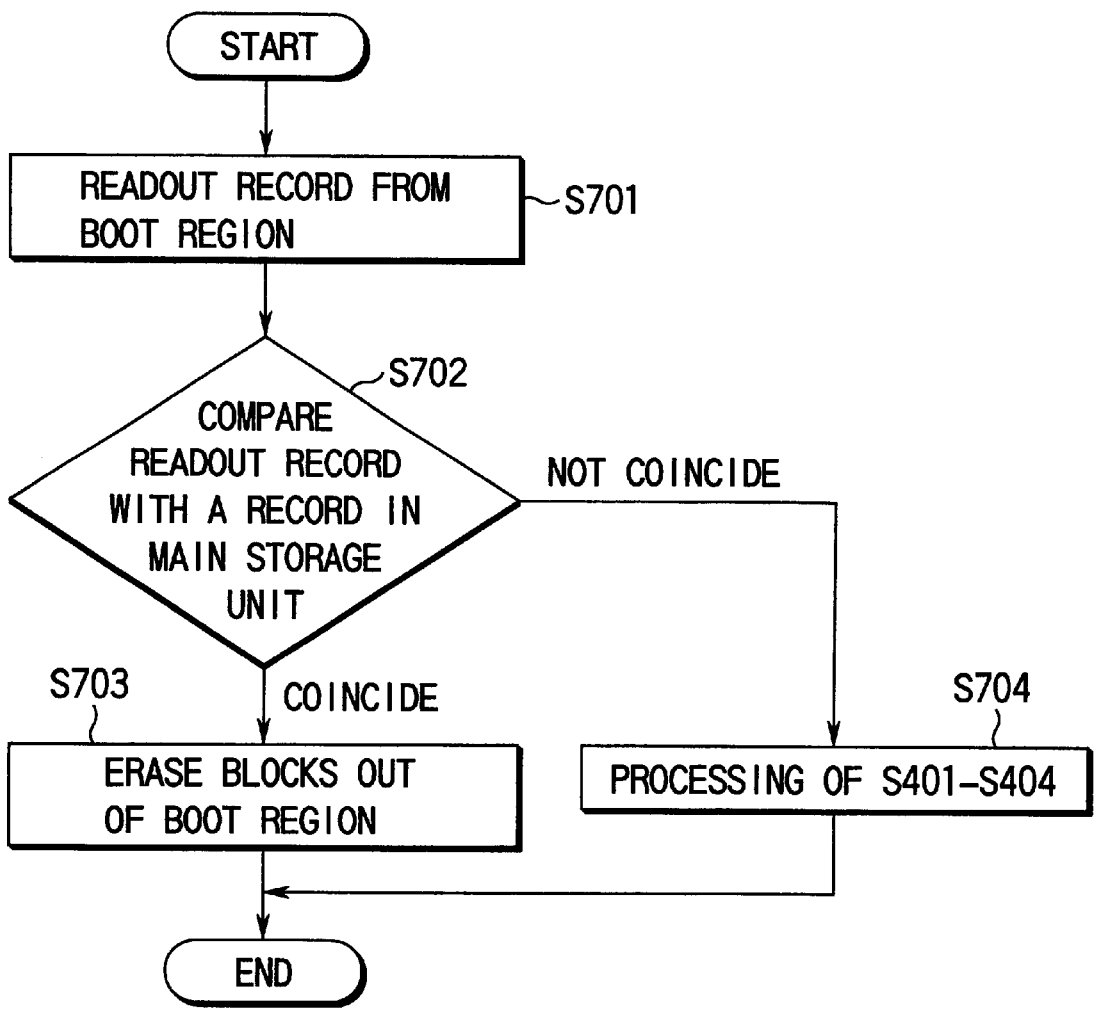
FIG. 15 is a flow chart showing a processing of formatting the flash memory according to the fourth embodiment of the present invention.

FIG. 15 is a flow chart showing a processing for formatting the flash memory 1 according to this embodiment. The processing of this flow chart is started by inputting a predetermined command to the I/O control circuit 22 from the CPU 31 through the system bus 34, IOC 33 and I/O bus 4 by user's operating an input device such as a key board (not shown) connected to the computer 3 like the processing of the flow chart shown in FIG. 10.

If the processing is started, the CPU 31 reads out a master boot record and partition boot record stored in the boot region of the flash memory 1 like the processing for power on in the first embodiment and temporarily stores them in the main storage unit 32 (step S701).

Next, to format the flash memory 1, the CPU 31 reads out the master boot record and partition boot record stored in the main storage unit 32 through the system bus 34, IOC 33, I/O bus 4 and I/O control circuit 22. Then, it is determined whether the readout master boot record and partition boot record coincide with the master boot record and partition boot record temporarily stored at step S701 (step S702).

If it is determined that they coincide at step S702, the processing of steps S301 to S307 are carried out for blocks other than the block 1 of the flash memory 1. As a result, data stored in the memory cell of blocks other than the block 1 (boot region) of the flash memory 1 is erased (step S703). The processing of this flow chart is terminated. As a result, the flash memory 1 is formatted as shown in FIG. 4.

On the other hand, if the comparison result does not coincide at step S702, the control circuit 21 carries out the processing of steps S401 to S404 shown in FIG. 10 so as to format the flash memory 1 (step S704), so that the processing of this flow chart is terminated.

According to the memory control system according to this embodiment, as described above, if the master boot record and partition boot record written in the boot region do not have to be changed when the flash memory 1 is formatted, the erasing of data written in the boot region and writing of data into the boot region are not carried out. Because data write-in processing and erase processing which take longer than data read-out processing do not have to be carried out, the flash memory 1 can be formatted more quickly than the memory control system according to the first embodiment.

Next, a fifth embodiment will be described. Although according to the first to fourth embodiments, the FAT and directory are written into an empty cluster in the data region appropriately, in the fifth embodiment the FAT and directory can be written into only a particular block.

According to this embodiment, the structure of the memory control system and the format structure of the flash memory 1 are the same as the first embodiment. However, the number of a cluster in which the FAT and directory data are to be written is not specified and instead, a particular number is allocated to a cluster belonging to a particular cluster group which will be described later. The CPU 31 determines a cluster in which the FAT and directory data are written according to an identification flag which will be described later.

Figure 16:
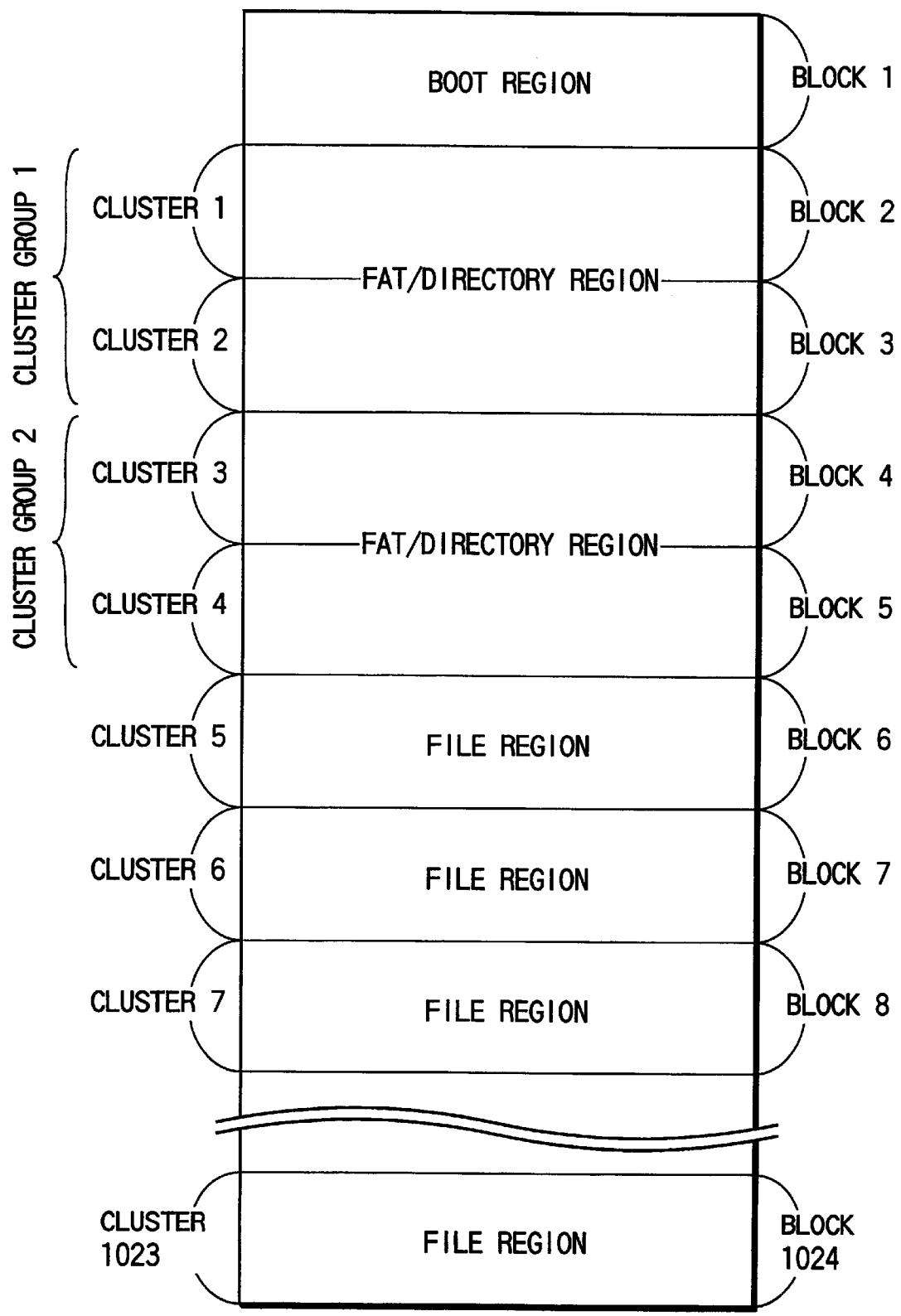
FIG. 16 is a diagram showing a particular cluster group for storing data of a file allocation table and directory according to a fifth embodiment of the present invention.

FIG. 16 is a diagram showing particular cluster groups for storing data of the FAT and directory according to this embodiment. As shown here, the particular cluster group includes two groups, cluster group 1 and cluster group 2, in any one of which the FAT and directory are to be written.

Figure 17:
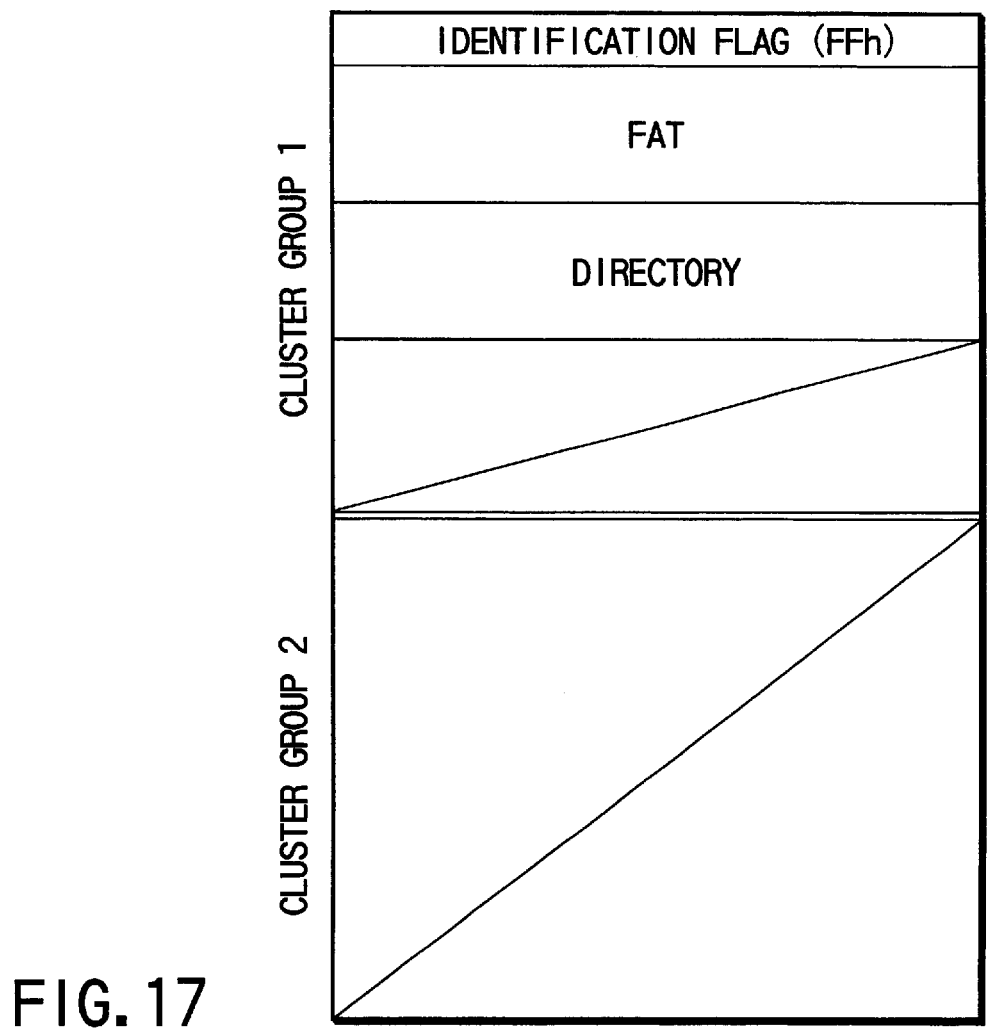
FIG. 17 is a diagram showing particular two cluster groups according to the fifth embodiment of the present invention.

The structures of the directory and FAT are substantially the same as the first and second embodiments. As shown in FIG. 17, an identification flag employing the value "FFh" which cannot be used by ordinary data is written at a head of a cluster group in which the FAT and directory are written. On the other hand, the cluster group in which the FAT and directory are not written is an empty block. Further, each identification code (not shown) is attached to the head of the FAT region and directory region.

Figure 18:
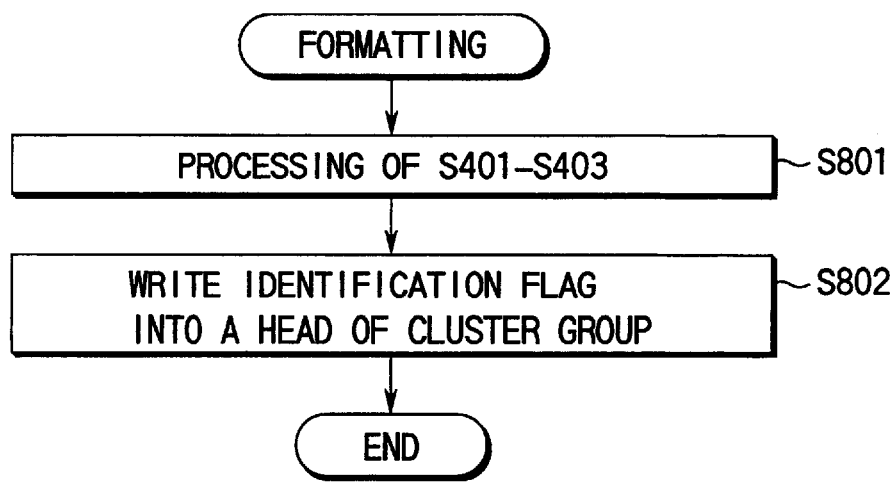
FIG. 18 is a flow chart of a processing for formatting the flash memory according to the fifth embodiment of the present invention.

The format processing on the flash memory executed by the control circuit 21 according to this embodiment will be described with reference to a flow chart of FIG. 18. The processing of this flow chart is started by inputting a predetermined command to the I/O control circuit 22 from the CPU 31 through the system bus 34, IOC 33 and I/O bus 4 by user's operating such an input device (not shown) as a key board connected to the computer 3.

After the processing is started, the control circuit 21 carries out the same processing as steps S401 to S403 of FIG. 5 (step S801). Next, the CPU 31 writes FFh data into a head page of a cluster group for storing initially set FAT and directory according to the processing of steps S201 to S212 and then terminates the processing of this flow chart (step S802). As a result, the flash memory 1 is formatted.

Figure 19:
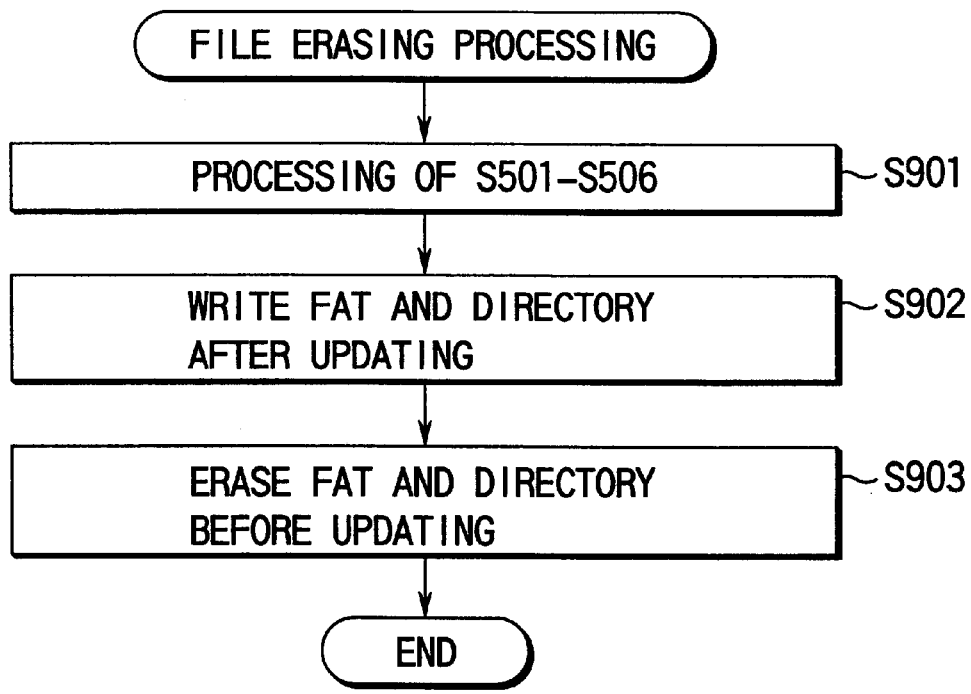
FIG. 19 is a flow chart showing a processing of erasing a file in the flash memory according to the fifth embodiment of the present invention.

A processing for erasing a file written in the flash memory 1 executed by the control circuit 21 according to this embodiment will be described with reference to a flow chart shown in FIG. 19. The processing of this flow chart is started by inputting a predetermined command to the I/O control circuit 22 from the CPU 31 through the system bus 34, IOC 33 and I/O bus 4 by user's operating such an input device (not shown) as a key board connected to the computer 3.

If the processing is started, the control circuit 21 carries out the processing of steps S501 to S506 (step S901). Next, the CPU 31 writes a content of the updated FAT and directory successively in each page following a head page of a cluster group in which the identification flat is not FFh, according to actions of the steps S201 to S212 (step S902).

Next, the CPU 31 erases the content of the cluster group in which the directory and FAT before updating are stored according to processing of steps S301 to S306 (step S903) and terminates the processing of this flow chart.

Figure 20:
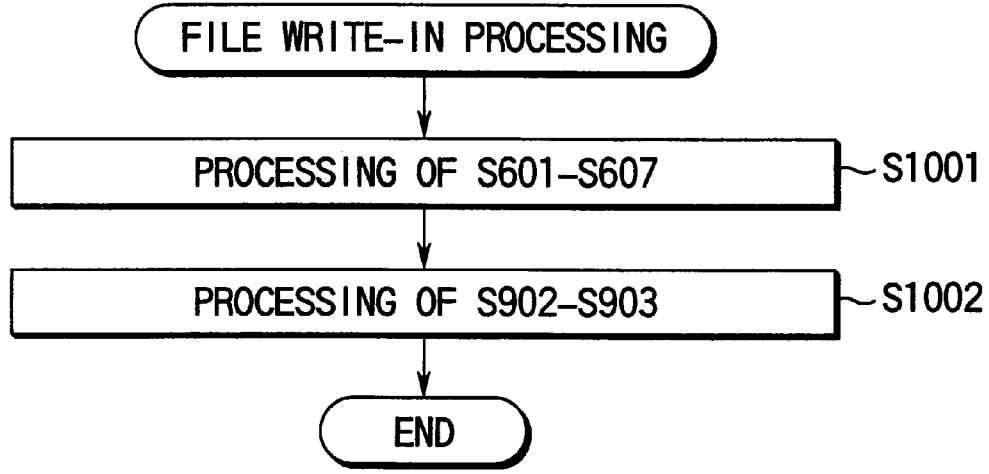
FIG. 20 is a flow chart showing a processing of writing a file into the flash memory according to the fifth embodiment of the present invention.

The processing of writing a file into the flash memory 1 executed by the control circuit 21 according to this embodiment will be described with reference to a flow chart shown in FIG. 20. The processing of this flow chart is started by inputting a predetermined command to the I/O control circuit 22 from the CPU 31 through the system bus 34, IOC 33 and I/O bus 4 by user's operating such an input device (not shown) as a key board connected to the computer 3.

Figure 11:
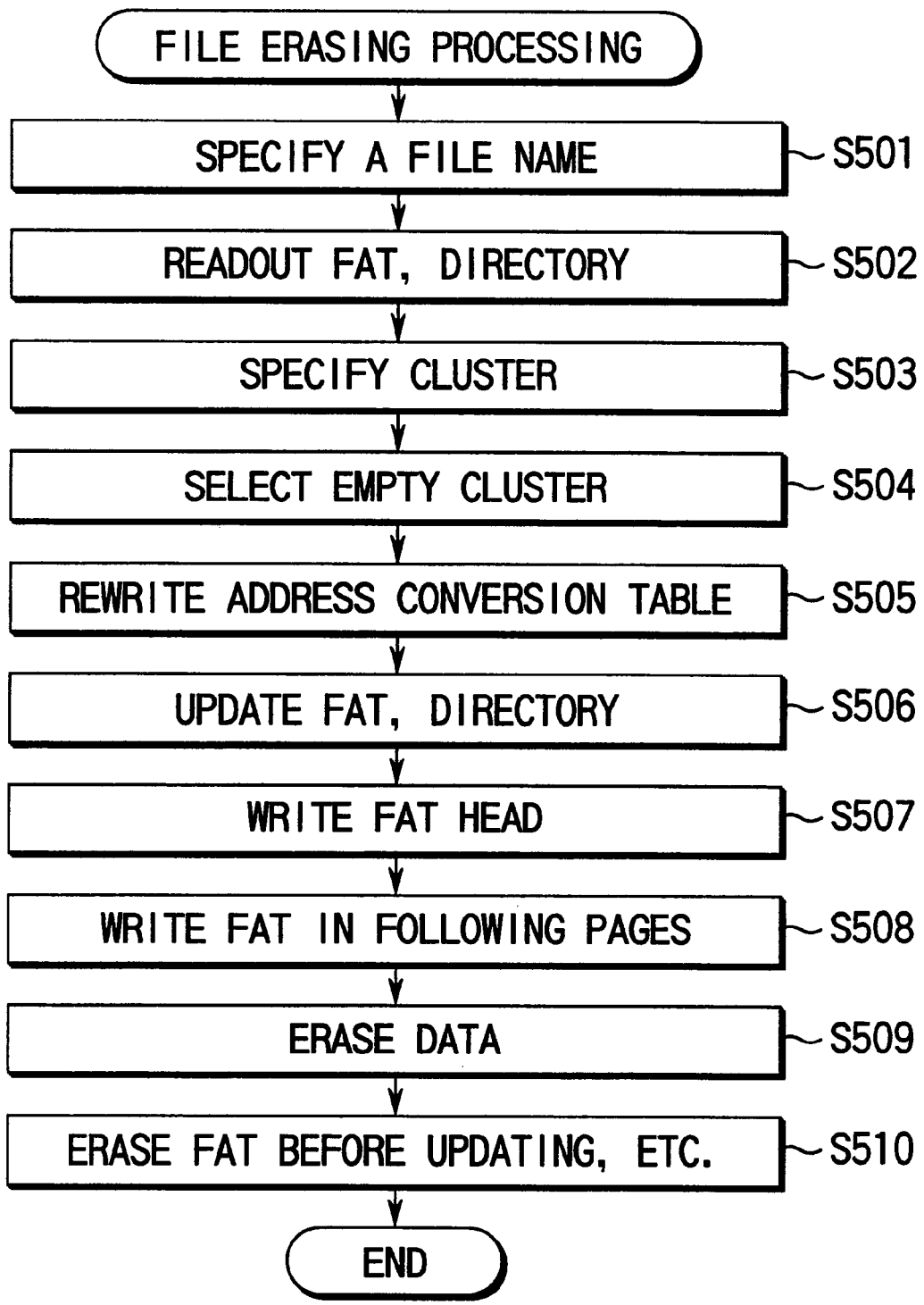
FIG. 11 is a flow chart showing file erasing in the flash memory according to the first embodiment of the present invention.

If the processing is started, the control circuit 21 carries out the processing of steps S601 to S607 shown in FIG. 11 (however, if it is determined that the number of empty clusters is insufficient at a processing of step S604, further processing of S610) (step S1001). Next, the CPU 31 carries out the processing of steps S902 to S903 (step S1002). In the updated FAT and directory, information indicating an erasing object file has been deleted, but information of a newly written file has been added. Then, the processing of the flow chart is terminated.

As described above, in the memory control system of this embodiment, the FAT and directory data can be read out even if the memory position of the FAT and directory data are not rewritten each time when file erasing or rewrite is performed. In the memory control system according to this embodiment, the number of clusters for constructing the cluster group is not restricted to 2 but the cluster group can be constructed by any number of clusters more than 1.

In the memory control system of this embodiment, particular two cluster groups for storing the FAT and directory data do not always have to be provided in a first region of the flash memory 1 but may be provided at any position.

A program (a driver for formatting) for carrying out a processing for formatting the flash memory 1, executed by the CPU 31 or the like may be provided by such a recording medium as a floppy disk and CR-ROM.

As described above, according to the block erasing type memory device according to this embodiment, data erasing and write-in can be carried out rapidly.

Further, the block erasing type memory device can be formatted so that data erasing and write-in can be carried out rapidly by executing a program stored in the program memory medium according to this embodiment. Further, by carrying out a program stored in the program memory medium of this embodiment, data erasing and write-in can be carried out rapidly.

What is claimed is:

1. A data processing system comprising:

a block erasing type memory device writing in and reading out data using a FAT and directory method and including a plurality of blocks having a first block including at least one formatting information region, capable of erasing stored data collectively in units of block; and data processing means for accessing said block erasing type memory device, wherein said data processing means includes:

control means connected to said block erasing type memory device for formatting said block erasing type memory device according to formatting information for allowing a cluster serving as a logical unit of a memory region of said block erasing type memory device to correspond in size and position with a block or integer ones of said blocks, and access means for determining the size and position of the cluster according to said format information and carrying out access control for data erasing, data write-in and data read-out for said block erasing type memory device formatted according to the determined size and position of the cluster.

2. A block erasing type memory device having a plurality of blocks and capable of erasing data collectively in units of block, wherein said block erasing type memory device writes in and reads out data using a FAT and directory method, and includes:

a memory region formatted according to format information for making one or integer ones of the blocks correspond to each of clusters, each cluster serving as a unit of said memory region, wherein each of said clusters has a size and position coinciding with a corresponding one of said blocks.

3. A block erasing type memory device according claim 2, wherein said format information comprises information for corresponding the size of each of said clusters with the size of each of said blocks and a position adjusting region for corresponding a start position and end position of each of said clusters with the start position and end position of each of said blocks.

4. A block erasing type memory device according to claim 3, in which directory information indicating a file name and head memory position and a file allocation table indicating a file position is stored in one of said clusters.

5. A block erasing type memory device according to claim 3, wherein stored data of the blocks other than said block for storing said format information is physically erased.

6. A block erasing type memory device according claim 2, in which directory information indicating a file name and head memory position and a file allocation table indicating a file position is stored in one of said clusters.

7. A block erasing type memory device according claim 2, wherein stored data of the blocks other than said block for storing said format information is physically erased.

8. A data storage medium storing a program comprising a set of instructions for:

physically erasing stored data of a block erasing type memory device capable of erasing stored data collectively in units of block; and writing information for allowing a size and position of each of clusters, each serving as a unit of data memory region, to correspond with the size and position of one or integer ones of the blocks into the block erasing type memory device the stored data of which has been erased.

9. A data storage medium according to claim 8, further storing a program including an instruction for, when stored data in the block erasing type memory device is instructed to be erased, physically erasing a storage content of the block including the data which has been instructed to be erased.

10. A data storage medium according to claim 8 or 9, further storing a program including an instruction for recording directory information for indicating a file name and head memory position and a file allocation table for indicating an allocation of the file, in each cluster.

* * * * *